(12) United States Patent
Kobel et al.

(10) Patent No.: US 12,495,276 B2
(45) Date of Patent: Dec. 9, 2025

(54) MULTIPLE MACHINE IDENTIFICATION SYSTEM AND METHOD

(71) Applicant: Oshkosh Corporation, Oshkosh, WI (US)

(72) Inventors: Korry D. Kobel, Oshkosh, WI (US); Fredric L. Yutzy, Oshkosh, WI (US); Dan Adamson, Oshkosh, WI (US); Stefan Eshleman, Oshkosh, WI (US); Greg Pray, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 680 days.

(21) Appl. No.: 17/576,826

(22) Filed: Jan. 14, 2022

(65) Prior Publication Data

US 2022/0229431 A1 Jul. 21, 2022

Related U.S. Application Data

(60) Provisional application No. 63/138,003, filed on Jan. 15, 2021, provisional application No. 63/138,015, (Continued)

(51) Int. Cl.
*G06F 3/048* (2013.01)
*B66F 9/06* (2006.01)
(Continued)

(52) U.S. Cl.
CPC .................. *H04W 4/08* (2013.01); *B66F 9/06* (2013.01); *B66F 9/0755* (2013.01);
(Continued)

(58) Field of Classification Search
CPC ......... H04W 4/08; H04W 4/70; H04W 76/15; H04W 4/029; H04W 4/30; H04W 76/23;
(Continued)

(56) References Cited

U.S. PATENT DOCUMENTS 3,009,747 A 11/1961 Pitzer
4,099,761 A 7/1978 Cullings
(Continued)

FOREIGN PATENT DOCUMENTS

CN 102756997 A 10/2012
CN 107426770 B 12/2017
(Continued)

OTHER PUBLICATIONS

Suzuki et al., "Teleoperation of Multiple Robots through the Internet", IEEE International Workshop on Robot and Human Communication, published 1996, pp. 84-89 (Year: 1996).
(Continued)

*Primary Examiner* — David Phantana-angkool
(74) *Attorney, Agent, or Firm* — FOLEY & LARDNER LLP

(57) ABSTRACT

A local fleet connectivity system for identifying multiple machines. The system includes a plurality of connectivity modules. Each connectivity module is communicatively and physically coupled to one of a plurality of machines. Each connectivity module configured to communicate with the other connectivity modules via a network connection. The system further includes a user device configured to communicate with the connectivity modules via a network connection. In response to a user selection on an application hosted on the user device, two or more machines of the plurality of machines are identified by one or both of an audible signal or a visual signal.

15 Claims, 15 Drawing Sheets

Related U.S. Application Data filed on Jan. 15, 2021, provisional application No. 63/137,955, filed on Jan. 15, 2021, provisional application No. 63/138,024, filed on Jan. 15, 2021, provisional application No. 63/137,893, filed on Jan. 15, 2021, provisional application No. 63/137,978, filed on Jan. 15, 2021, provisional application No. 63/137,950, filed on Jan. 15, 2021, provisional application No. 63/138,016, filed on Jan. 15, 2021, provisional application No. 63/137,867, filed on Jan. 15, 2021, provisional application No. 63/137,996, filed on Jan. 15, 2021.

(51) Int. Cl.

| | | |
|---|---|---|
| B66F 9/075 | (2006.01) | |
| B66F 9/12 | (2006.01) | |
| B66F 11/04 | (2006.01) | |
| G05B 19/4155 | (2006.01) | |
| G05D 1/00 | (2006.01) | |
| G05D 1/224 | (2024.01) | |
| G05D 1/225 | (2024.01) | |
| G05D 1/226 | (2024.01) | |
| G05D 1/692 | (2024.01) | |
| G05D 1/86 | (2024.01) | |
| G06F 3/0482 | (2013.01) | |
| G06F 3/0484 | (2022.01) | |
| G06F 3/0488 | (2022.01) | |
| G06Q 10/20 | (2023.01) | |
| G06Q 30/0251 | (2023.01) | |
| G06Q 30/0601 | (2023.01) | |
| G07C 5/00 | (2006.01) | |
| G07C 5/08 | (2006.01) | |
| G08B 3/00 | (2006.01) | |
| G08B 5/36 | (2006.01) | |
| G08B 7/06 | (2006.01) | |
| G08B 21/18 | (2006.01) | |
| H04L 67/52 | (2022.01) | |
| H04L 67/63 | (2022.01) | |
| H04W 4/029 | (2018.01) | |
| H04W 4/08 | (2009.01) | |
| H04W 4/30 | (2018.01) | |
| H04W 4/40 | (2018.01) | |
| H04W 4/70 | (2018.01) | |
| H04W 8/00 | (2009.01) | |
| H04W 48/16 | (2009.01) | |
| H04W 76/14 | (2018.01) | |
| H04W 76/15 | (2018.01) | |
| H04W 76/23 | (2018.01) | |
| B66F 17/00 | (2006.01) | |
| G06F 16/93 | (2019.01) | |
| H04W 4/35 | (2018.01) | |
| H04W 4/80 | (2018.01) | |
| H04W 84/12 | (2009.01) | |
| H04W 84/18 | (2009.01) | |
| H04W 88/08 | (2009.01) | |

(52) U.S. Cl.
CPC ............ *B66F 9/07581* (2013.01); *B66F 9/12* (2013.01); *B66F 11/046* (2013.01); *G05B 19/4155* (2013.01); *G05D 1/0022* (2013.01); *G05D 1/0027* (2013.01); *G05D 1/0044* (2013.01); *G05D 1/005* (2013.01); *G05D 1/224* (2024.01); *G05D 1/2246* (2024.01); *G05D 1/225* (2024.01); *G05D 1/226* (2024.01); *G05D 1/692* (2024.01); *G05D 1/86* (2024.01); *G06F 3/0482* (2013.01); *G06F 3/0484* (2013.01); *G06F 3/0488* (2013.01); *G06Q 10/20* (2013.01); *G06Q 30/0251* (2013.01); *G06Q 30/0611* (2013.01); *G06Q 30/0631* (2013.01); *G06Q 30/0641* (2013.01); *G07C 5/006* (2013.01); *G07C 5/0825* (2013.01); *G08B 3/00* (2013.01); *G08B 5/36* (2013.01); *G08B 7/06* (2013.01); *G08B 21/18* (2013.01); *H04L 67/52* (2022.05); *H04L 67/63* (2022.05); *H04W 4/029* (2018.02); *H04W 4/30* (2018.02); *H04W 4/40* (2018.02); *H04W 4/70* (2018.02); *H04W 8/005* (2013.01); *H04W 48/16* (2013.01); *H04W 76/14* (2018.02); *H04W 76/15* (2018.02); *H04W 76/23* (2018.02); *B66F 11/04* (2013.01); *B66F 17/006* (2013.01); *G05B 2219/45049* (2013.01); *G06F 16/93* (2019.01); *H04W 4/35* (2018.02); *H04W 4/80* (2018.02); *H04W 84/12* (2013.01); *H04W 84/18* (2013.01); *H04W 88/08* (2013.01); *H04W 88/085* (2013.01)

(58) Field of Classification Search
CPC ........ H04W 76/14; H04W 4/40; H04L 67/63; G06F 3/048
See application file for complete search history.

(56) References Cited

U.S. PATENT DOCUMENTS

| | | |
|---|---|---|
| 4,178,591 A | 12/1979 | Geppert |
| 4,315,652 A | 2/1982 | Barwise |
| 4,426,110 A | 1/1984 | Mitchell et al. |
| 4,461,608 A | 7/1984 | Boda |
| 4,572,567 A | 2/1986 | Johnson |
| 4,573,728 A | 3/1986 | Johnson |
| 4,810,020 A | 3/1989 | Powell |
| 5,026,104 A | 6/1991 | Pickrell |
| 5,092,731 A | 3/1992 | Jones et al. |
| 5,209,537 A | 5/1993 | Smith et al. |
| 5,330,242 A | 7/1994 | Lucky, Sr. |
| 5,730,430 A | 3/1998 | Hodson et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,264,013 B1 | 7/2001 | Hodgins |
| 6,315,515 B1 | 11/2001 | Young et al. |
| 6,336,783 B1 | 1/2002 | Young et al. |
| 6,350,098 B1 | 2/2002 | Christenson et al. |
| 6,411,887 B1 | 6/2002 | Martens et al. |
| 6,447,239 B2 | 9/2002 | Young et al. |
| 6,474,928 B1 | 11/2002 | Christenson |
| 6,526,335 B1 | 2/2003 | Treyz et al. |
| 6,565,305 B1 | 5/2003 | Schrafel |
| 6,611,755 B1 | 8/2003 | Coffee et al. |
| 6,993,421 B2 | 1/2006 | Pillar et al. |
| 7,070,382 B2 | 7/2006 | Pruteanu et al. |
| 7,207,610 B1 | 4/2007 | Kauppila |
| 7,284,943 B2 | 10/2007 | Pruteanu et al. |
| 7,398,137 B2 | 7/2008 | Ferguson et al. |
| 7,556,468 B2 | 7/2009 | Grata |
| 7,559,735 B2 | 7/2009 | Pruteanu et al. |
| 7,721,857 B2 | 5/2010 | Harr |
| 7,878,750 B2 | 2/2011 | Zhou et al. |

(56) References Cited

U.S. PATENT DOCUMENTS

| | | |
|---|---|---|
| 7,934,758 B2 | 5/2011 | Stamey et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,514,058 B2 | 8/2013 | Cameron |
| 8,533,604 B1 | 9/2013 | Parenti et al. |
| 8,540,475 B2 | 9/2013 | Kuriakose et al. |
| 8,655,505 B2 | 2/2014 | Sprock et al. |
| 8,807,613 B2 | 8/2014 | Howell et al. |
| 8,833,823 B2 | 9/2014 | Price et al. |
| 9,028,193 B2 | 5/2015 | Goedken |
| 9,216,856 B2 | 12/2015 | Howell et al. |
| 9,387,985 B2 | 7/2016 | Gillmore et al. |
| 9,523,582 B2 | 12/2016 | Chandrasekar et al. |
| 9,624,033 B1 | 4/2017 | Price et al. |
| 9,694,776 B2 | 7/2017 | Nelson et al. |
| 9,880,581 B2 | 1/2018 | Kuriakose et al. |
| 9,886,565 B2 | 2/2018 | Nielsen et al. |
| 9,981,803 B2 | 5/2018 | Davis et al. |
| 10,018,171 B1 | 7/2018 | Breiner et al. |
| 10,035,648 B2 | 7/2018 | Haddick et al. |
| 10,196,205 B2 | 2/2019 | Betz et al. |
| 10,221,012 B2 | 3/2019 | Hund, Jr. |
| 10,311,526 B2 | 6/2019 | Takeda |
| 10,373,087 B1 | 8/2019 | Yang et al. |
| 10,457,533 B2 | 10/2019 | Puszkiewicz et al. |
| 10,663,955 B2 | 5/2020 | Kuikka |
| 10,693,955 B2 | 6/2020 | Lalsangi et al. |
| 10,796,577 B2 | 10/2020 | Katou et al. |
| 10,798,113 B2 * | 10/2020 | Muddu ............... H04L 63/1441 |
| 10,899,538 B2 | 1/2021 | Nelson et al. |
| 10,913,428 B2 * | 2/2021 | Dingli ............... G08B 13/19647 |
| 10,977,943 B1 * | 4/2021 | Hayward ........... G01C 21/3667 |
| 11,252,149 B1 * | 2/2022 | Bang ........................ G06F 3/167 |
| 11,493,903 B2 * | 11/2022 | Cella .................. G06Q 30/0278 |
| 11,888,853 B2 | 1/2024 | Childress et al. |
| 11,948,019 B1 * | 4/2024 | Singh ..................... G06F 9/547 |
| 12,130,780 B2 * | 10/2024 | Nishii .................. H04N 1/4433 |
| 12,200,783 B2 * | 1/2025 | Kopchinsky .......... H04L 67/125 |
| 2002/0070862 A1 | 6/2002 | Francis et al. |
| 2002/0079713 A1 | 6/2002 | Moilanen et al. |
| 2002/0123345 A1 | 9/2002 | Mahany et al. |
| 2003/0158640 A1 | 8/2003 | Pillar et al. |
| 2004/0114557 A1 | 6/2004 | Bryan et al. |
| 2005/0002354 A1 | 1/2005 | Kelly et al. |
| 2005/0140154 A1 | 6/2005 | Vigholm et al. |
| 2005/0149920 A1 | 7/2005 | Patrizi et al. |
| 2006/0132323 A1 | 6/2006 | Grady |
| 2007/0130296 A1 | 6/2007 | Kim |
| 2007/0213869 A1 | 9/2007 | Bandringa et al. |
| 2009/0005928 A1 | 1/2009 | Sells et al. |
| 2009/0049441 A1 | 2/2009 | Mii et al. |
| 2009/0088924 A1 | 4/2009 | Coffee et al. |
| 2009/0099897 A1 * | 4/2009 | Ehrman ......... G06Q 10/063114 |
| | | 705/7.15 |
| 2009/0101447 A1 | 4/2009 | Durham et al. |
| 2010/0179844 A1 | 7/2010 | Lafergola et al. |
| 2010/0271191 A1 | 10/2010 | De Graff et al. |
| 2011/0010023 A1 | 1/2011 | Kunzig et al. |
| 2011/0040440 A1 | 2/2011 | De Oliveira et al. |
| 2011/0081193 A1 | 4/2011 | Nilsson |
| 2012/0001876 A1 | 1/2012 | Chervenka et al. |
| 2012/0046809 A1 | 2/2012 | Wellman |
| 2013/0057007 A1 | 3/2013 | Howell et al. |
| 2013/0127611 A1 | 5/2013 | Bernstein et al. |
| 2013/0132140 A1 | 5/2013 | Amin et al. |
| 2013/0240300 A1 | 9/2013 | Fagan et al. |
| 2014/0214240 A1 | 7/2014 | Funke et al. |
| 2014/0241332 A1 | 8/2014 | Yang et al. |
| 2014/0278621 A1 | 9/2014 | Medwin et al. |
| 2014/0312639 A1 | 10/2014 | Petronek |
| 2015/0185716 A1 | 7/2015 | Wichmann et al. |
| 2015/0310674 A1 | 10/2015 | Humphrey et al. |
| 2015/0376869 A1 | 12/2015 | Jackson |
| 2016/0052762 A1 | 2/2016 | Swift |
| 2016/0057004 A1 | 2/2016 | Ge |
| 2016/0121490 A1 | 5/2016 | Ottersland |
| 2016/0208992 A1 | 7/2016 | Parsons |
| 2016/0221816 A1 | 8/2016 | Pollock et al. |
| 2016/0234259 A1 | 8/2016 | Talmaki et al. |
| 2016/0272471 A1 | 9/2016 | Jaipaul |
| 2016/0304051 A1 | 10/2016 | Archer et al. |
| 2016/0318438 A1 | 11/2016 | Wadell |
| 2016/0371433 A1 * | 12/2016 | Polesskiy ............... A63F 13/825 |
| 2017/0149901 A1 | 5/2017 | Condeixa et al. |
| 2017/0167088 A1 | 6/2017 | Walker et al. |
| 2017/0169631 A1 | 6/2017 | Walker et al. |
| 2017/0212526 A1 | 7/2017 | Vanderpool et al. |
| 2017/0269608 A1 | 9/2017 | Chandrasekar et al. |
| 2017/0270490 A1 | 9/2017 | Penilla et al. |
| 2017/0289121 A1 | 10/2017 | Harwell |
| 2017/0291805 A1 | 10/2017 | Hao et al. |
| 2017/0301210 A1 | 10/2017 | King et al. |
| 2018/0065544 A1 | 3/2018 | Brusco |
| 2018/0143734 A1 | 5/2018 | Ochenas et al. |
| 2018/0150885 A1 | 5/2018 | Albinger et al. |
| 2018/0151037 A1 | 5/2018 | Morgenthau et al. |
| 2018/0164993 A1 | 6/2018 | Zummo et al. |
| 2018/0234266 A1 | 8/2018 | Rudolph et al. |
| 2018/0276909 A1 | 9/2018 | Harshbarger et al. |
| 2018/0335903 A1 | 11/2018 | Coffman et al. |
| 2019/0033172 A1 | 1/2019 | Montemurro et al. |
| 2019/0156394 A1 | 5/2019 | Karmakar |
| 2019/0180354 A1 * | 6/2019 | Greenberger ........... G07F 17/13 |
| 2019/0246060 A1 | 8/2019 | Tanabe et al. |
| 2019/0376459 A1 | 12/2019 | Pieczko et al. |
| 2020/0014759 A1 | 1/2020 | Wunderlich |
| 2020/0065433 A1 | 2/2020 | Duff et al. |
| 2020/0134955 A1 | 4/2020 | Kishita |
| 2020/0183362 A1 | 6/2020 | Ledwith et al. |
| 2020/0207166 A1 | 7/2020 | Froehlich |
| 2020/0298801 A1 * | 9/2020 | Dingli ..................... B60R 22/48 |
| 2020/0317489 A1 | 10/2020 | Bhatia et al. |
| 2021/0023985 A1 | 1/2021 | Stadnyk |
| 2021/0055178 A1 | 2/2021 | Hinderling et al. |
| 2021/0056771 A1 | 2/2021 | Federle |
| 2021/0087035 A1 | 3/2021 | Yip et al. |
| 2021/0090363 A1 | 3/2021 | Ramos et al. |
| 2021/0125123 A1 | 4/2021 | Subramanian et al. |
| 2021/0211852 A1 | 7/2021 | Ramalho De Oliveira et al. |
| 2021/0232137 A1 | 7/2021 | Whitfield et al. |
| 2021/0250178 A1 | 8/2021 | Herman et al. |
| 2022/0025611 A1 | 1/2022 | Kandula et al. |
| 2022/0035364 A1 | 2/2022 | Laclef et al. |
| 2022/0156921 A1 | 5/2022 | Humpston et al. |
| 2022/0221365 A1 | 7/2022 | Mahurkar et al. |
| 2022/0229415 A1 * | 7/2022 | Kobel ................. G05B 19/4155 |
| 2022/0229431 A1 * | 7/2022 | Kobel ..................... H04W 4/70 |
| 2022/0230224 A1 * | 7/2022 | Kobel ..................... H04W 4/30 |
| 2022/0230488 A1 * | 7/2022 | Kobel et al. |
| 2022/0232649 A1 * | 7/2022 | Kobel .................... G06F 3/0482 |
| 2023/0224680 A1 * | 7/2023 | Kobel ....................... B66F 9/06 |
| | | 370/328 |
| 2023/0247390 A1 * | 8/2023 | Kobel .................... H04W 4/46 |
| | | 340/679 |
| 2024/0073651 A1 * | 2/2024 | Kobel .................... G06Q 10/20 |
| 2024/0089708 A1 * | 3/2024 | Kobel ....................... B66F 9/12 |
| 2024/0235931 A1 * | 7/2024 | Nolan ................... H04L 61/4505 |

FOREIGN PATENT DOCUMENTS

| | | |
|---|---|---|
| CN | 207608281 U | 7/2018 |
| CN | 111126522 A | 5/2020 |
| DE | 10 2007 020 182 A1 | 10/2008 |
| DE | 10 2018 217 716 A1 | 5/2019 |
| EP | 1 136 433 A2 | 9/2001 |
| EP | 2 886 507 A1 | 6/2015 |
| EP | 3 112 312 A1 | 1/2017 |
| EP | 3 173 369 A1 | 5/2017 |
| EP | 3 200 482 A1 | 8/2017 |
| EP | 3 896 024 A1 | 10/2021 |
| EP | 4 048 842 B1 | 8/2022 |
| JP | H08-282995 A | 10/1996 |
| JP | H1059698 A | 3/1998 |

(56) References Cited

FOREIGN PATENT DOCUMENTS

| | | |
|---|---|---|
| JP | 2016-159996 A | 9/2016 |
| JP | 2020-128270 A | 8/2020 |
| JP | 2021-052920 A | 4/2021 |
| WO | WO-01/30671 A2 | 5/2001 |
| WO | WO-2011/019872 A2 | 2/2011 |
| WO | WO-2012/109444 A2 | 8/2012 |
| WO | WO-2020/121613 A1 | 6/2020 |

OTHER PUBLICATIONS

International Search Report and Written Opinion issued in connection with PCT Appl. Ser. No. PCT/US2022/012610 dated Jun. 21, 2022 (19 pages).

Invitation to Pay Additional Fees issued in connection with PCT Appl. Ser. No. PCT/US2022/012610 dated Apr. 28, 2022 (136 pages).

Invitation to Pay Additional Fees issued in connection with PCT Appl. Ser. No. PCT/US2022/012628 dated May 13, 2022 (134 pages).

Notification of Transmittal of the International Search Report and the Written Opinion of the International Search Authority, or the Declaration issued in connection with PCT Appl. Ser. No. PCT/US2022/012603 dated Jul. 6, 2022 (27 pages).

Notification of Transmittal of the International Search Report and the Written Opinion of the International Search Authority, or the Declaration issued in connection with PCT Appl. Ser. No. PCT/US2022/012628 dated Jul. 6, 2022 (27 pages).

Extended European Search Report issued in EP Appl. No. 25187841.9 dated Sep. 10, 2025.

B. Ressa and A. Mori, "An incremental approach to the advanced teleoperation of an earthwork equipment," Proceedings of the Intelligent Vehicles '94 Symposium, Paris, France, 1994, pp. 556-561, doi: 10.1109/IVS.1994.639578. (Year: 1994).

J. Ramos, R. Ribeiro, D. Safadinho, J. Barroso and A. Pereira, "Communication Protocol for Unmanned Vehicles : An Architectural Approach," 2020 Global Internet of Things Summit (GIoTS), Dublin, Ireland, 2020, pp. 1-7, doi: 10.1109/ GIOTS49054.2020.9119640. (Year: 2020).

M. C. Mora, V. Suesta, L. Armesto and J. Tornero, "Factory management and transport automation," EFTA 2003. 2003 IEEE Conference on Emerging Technologies and Factory Automation. Proceedings (Cat. No.03TH8696), Lisbon, Portugal, 2003, pp. 508-515 vol. 2, doi: 10.1109/ETFA.2003.1248741. (Year: 2003).

Non-Final Office Action on U.S. Appl. No. 18/645,981 dated Oct. 14, 2025.

R. Bostelman and W. Shackleford, "Improved performance of an automated guided vehicle by using a smart diagnostics tool," 2010 IEEE International Conference on Industrial Technology, Via del Mar, Chile, 2010, pp. 1688-1693, doi: 10.1109/ICIT.2010.5472637. (Year: 2010).

\* cited by examiner

MULTIPLE MACHINE IDENTIFICATION SYSTEM AND METHOD

CROSS-REFERENCE TO RELATED PATENT APPLICATIONS

This application claims the benefit of and priority to U.S. Provisional Application No. 63/137,950, filed on Jan. 15, 2021, U.S. Provisional Application No. 63/137,955, filed on Jan. 15, 2021, U.S. Provisional Application No. 63/137,996, filed on Jan. 15, 2021, U.S. Provisional Application No. 63/138,003, filed on Jan. 15, 2021, U.S. Provisional Application No. 63/138,015, filed on Jan. 15, 2021, U.S. Provisional Application No. 63/138,016, filed on Jan. 15, 2021, U.S. Provisional Application No. 63/138,024, filed on Jan. 15, 2021, U.S. Provisional Application No. 63/137,867, filed on Jan. 15, 2021, U.S. Provisional Application No. 63/137,893, filed on Jan. 15, 2021, and U.S. Provisional Application No. 63/137,978, filed on Jan. 15, 2021, all of which are hereby incorporated by reference herein.

BACKGROUND

Work equipment such as lifts and telehandlers sometimes require identifying, tracking, tasking, monitoring, and servicing at a work site.

SUMMARY OF THE INVENTION

One embodiment of the present disclosure relates to a local fleet connectivity system for identifying multiple machines. The system includes a plurality of connectivity modules, each connectivity module communicatively and physically coupled to one of a plurality of machines, each connectivity module configured to communicate with the other connectivity modules via a network connection and a user device configured to communicate with the connectivity modules via a network connection. In response to a user selection on an application hosted on the user device, two or more machines of the plurality of machines are identified by one or both of an audible signal or a visual signal.

In some aspects of the system, each of the two or more machines are identified by a different visual signal. In some aspects, the connectivity modules of the two or more machines each comprise a light configured to illuminate to generate the visual signal, wherein the light of each connectivity module of the two or more machines illuminates with a different color. In some aspects, the user selection comprises dynamically filtering the plurality of machines according to one or more selectable attributes or criteria. In some aspects, the one or more selectable attributes or criteria comprise one or more of a machine type, a battery status, a machine model number, a machine manufacturer, a machine location, a machine work site tag, a machine status, a repair status, a DTC status, a fuel status, a use status, or a number of other machines that must be used to access or move a machine. In some aspects, the two or more machines comprise a user-selected first machine and one or more other machines that are required to be moved in order to move the user-selected first machine to a selected location, wherein the one or more other machines are automatically selected by the application based on the selection of the user-selected first machine. In some aspects, a control module of each of the one or more other machines is configured (i) to receive instructions via the connectivity module of the associated machine and (ii) to control and move the associated machine out of a path of the user-selected first machine to the selected location.

Another exemplary embodiment relates to a local fleet connectivity system for identifying multiple machines at a site. The system includes one or more processing circuits comprising one or more memory devices coupled to one or more processors. The one or more memory devices configured to store instructions thereon that, when executed by the one or more processors, cause the one or more processors to communicate across a wireless network by sending messages to a plurality of machines and a user device each communicatively connected to the network; generate a graphical user interface (GUI) comprising a list of the plurality of machines; send the GUI to a screen of the user device for display; receive, via the GUI, an indication of a selection one or more attributes or criteria; and filter, in response to receiving the indication, the list to create a subset of machines, from the plurality of machines, that match the selected attributes or criteria.

In some aspects of the system, the GUI comprises a map showing a location of each machine and wherein filtering the list comprises removing machines from the map that do not match the selected attributes or criteria. In some aspects, the instructions further cause the one or more processors to: receive, via the GUI, an indication of a required number of machines; identify a subgroup of machines from the subset of machines, wherein the subgroup of machines comprises the required number of machines; and send a message instructing the subgroup of machines to generate one or both of a visual indication or an audible indication. In some aspects the subgroup of machines consists of the machines in the subset of machines that are physically closest to the user device. In some aspects, the instructions further cause the one or more processors to receive, via the GUI, an indication of a selection of a location, wherein the subgroup of machines consists of the machines in the subset of machines that are physically closest to the selected location. In some aspects, the message instructs each machine to generate a visual or audible indicator that is different than the visual or audible indicator of the other machines. In some aspects, the instructions further cause the one or more processors to update the GUI to identify the visual or audible indicator associated with each machine in the subgroup of machines; receive, via the GUI, an indication of a selection of a machine from the subgroup; and send a message, in response to receiving the indication of a selection of a machine, an instruction to the selected machine to generate a second visual or audible indication. In some aspects, the instructions further cause the one or more processors to receive, via the GUI, an indication of a selection of a location, wherein the subgroup of machines consists of the machines in the subset of machines that can be moved to the location while moving a minimum number of the machines in the plurality of machines.

Another exemplary embodiment relates to a method of identifying multiple machines at a site. The method includes generating a graphical user interface (GUI) comprising a list of a plurality of machines sending the GUI to a screen of a user device for display receiving, via the GUI, an indication of a selection one or more attributes or criteria; and filtering, in response to receiving the indication, the list to create a subset of machines, from the plurality of machines, that match the selected attributes or criteria.

In some aspects, the method includes receiving, via the GUI, an indication of a required number of machines; identifying a subgroup of machines from the subset of machines, wherein the subgroup of machines comprises the required number of machines; and sending a message instructing the subgroup of machines to generate one or both of a visual indication or an audible indication. In some aspects, the subgroup of machines consists of the machines in the subset of machines that are physically closest to a selected location. In some aspects the message instructs each machine to generate a visual or audible indicator that is different than the visual or audible indicator of the other machines, and the method further includes updating the GUI to identify the visual or audible indicator associated with each machine in the subgroup of machines receiving, via the GUI, an indication of a selection of a machine from the subgroup sending a message, in response to receiving the indication of a selection of a machine, an instruction to the selected machine to generate a second visual or audible indication. In some aspects, the subgroup of machines consists of the machines in the subset of machines can be moved to a selected location while moving a minimum number of machines form the plurality of machines.

One exemplary implementation of the present disclosure relates to a multiple machine identification system. In some embodiments, the multiple machine identification system interconnects with work machines at a work site. The multiple machine identification system may include beacon devices (e.g. a connectivity module with beacon) and user devices hosting machine identification applications. The multiple machine identification system may, for example, identify several machines at a time from a group of machines at a work site both digitally in an application and on the machine (e.g. by activating a beacon light). The multiple machine identification system may enable a user to pick a machine physically and tie it to a digital version of the machine (e.g. a "digital twin" or a digital model of a specific machine accessible via an application). The multiple machine identification system may, for example, save a user time searching for serial numbers and matching them by automatically matching a work machine at a work site with a digital data file for the machine. In some examples, the multiple machine identification system may generate a graphic display of a machine population. The graphic display of the machine population may be generated using one or more selectable dynamic filters that may be applied to identify a particular machine population or sub-population at one or more work sites. In some examples, the selectable dynamic filters may perform filtering according to one or more selectable attributes or criteria (e.g. a machine type, a machine model number, a machine manufacturer, a machine location, a machine work site tag, a machine status, a fuel status, a use status, etc.). The multiple machine identification system criteria may include, for example, which machine is easiest to pull out, which machine is fully charged, which machine has no faults, etc. Criteria may be user defined and may be applied individually or collectively to identify multiple machines at a work site that meet some or all of the criteria. In some embodiments, the machine identity system graphic display may be presented to a local user via a work site network. The multiple machine identification system may be hosted on a local or remote server and may generate graphical user interfaces for users to identify multiple machines on mobile user devices at a work site or on remote terminals (e.g. an off-site fleet management user station). In some instances, a remote user may apply desired filters or configuration setting to the multiple machine identification system graphical user interface presented on a user interface device to a local user at a work site. In some embodiments, the multiple machine identification system graphical user interface may display status or condition of work machines within a population of work machines in a combined view or in separate views.

In some embodiments, multiple machine identification system includes a connectivity module beacon device. The connectivity module beacon device may indicate a location, a status, or a condition of a work machine in response to commands provided via the multiple machine identification system. The status or condition of a work machine may include, for example, a fuel level, an ignition on/off condition, a condition of movement, a state of charge status, a DTC status, and a repair status. In some embodiments, the connectivity module beacon device may be selectively commanded to indicate a particular status or condition of work machines within a population of work machines for work machines that are within a selected range of a user device.

In some embodiments, identification of the location, status, or condition of particular work machines at a work site indicated by the beacon device may be selected independent of or in conjunction with one or more filter criteria that a user applies to a population of sub-population of work machines within the equipment identity system.

In some embodiments, the local fleet connectivity system may enable a user to transmit a command to a particular work machine to power up or power down.

The local fleet connectivity system includes one or more processing circuits comprising one or more memory devices coupled to one or more processors, the one or more memory devices configured to store instructions thereon that, when executed by the one or more processors, cause the one or more processors to: communicate across a wireless network by sending messages across nodes that are created by different machines and extend a connection with one nearby machine to a network of machines to connect to various machines across a work site. The local fleet connectivity system then automatically identifies equipment connected to the network of machines. In some embodiments, the local fleet connectivity system may be supported by an ad hoc machine to machine network. In some embodiments, the local fleet connectivity system may be supported by a self-organizing network on a work site. In some embodiments, the communications means between machines connected to the network of machines may comprise wired networking, short range radio frequency networking (e.g. Bluetooth, Bluetooth Low Energy, Wi-Fi, VHF, or UHF), optical communications networking, or long range radio frequency networking (e.g. satellite communications). In some embodiments, the network of machines may be a mesh network. In some embodiments, access to machine-specific data from machines connected to the network of machines may be associated with one or more codes (e.g. a customer key). In some embodiments, the one or more codes may be associated with a fleet of equipment. In some embodiments, machine specific data may be accessed via the network for a machine connected to the equipment self-forming network where the machine is associated with a specific code (e.g. customer key). In some embodiments, machine specific data for a plurality of machines connected to the network of machines may be accessed via the network using a customer account.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
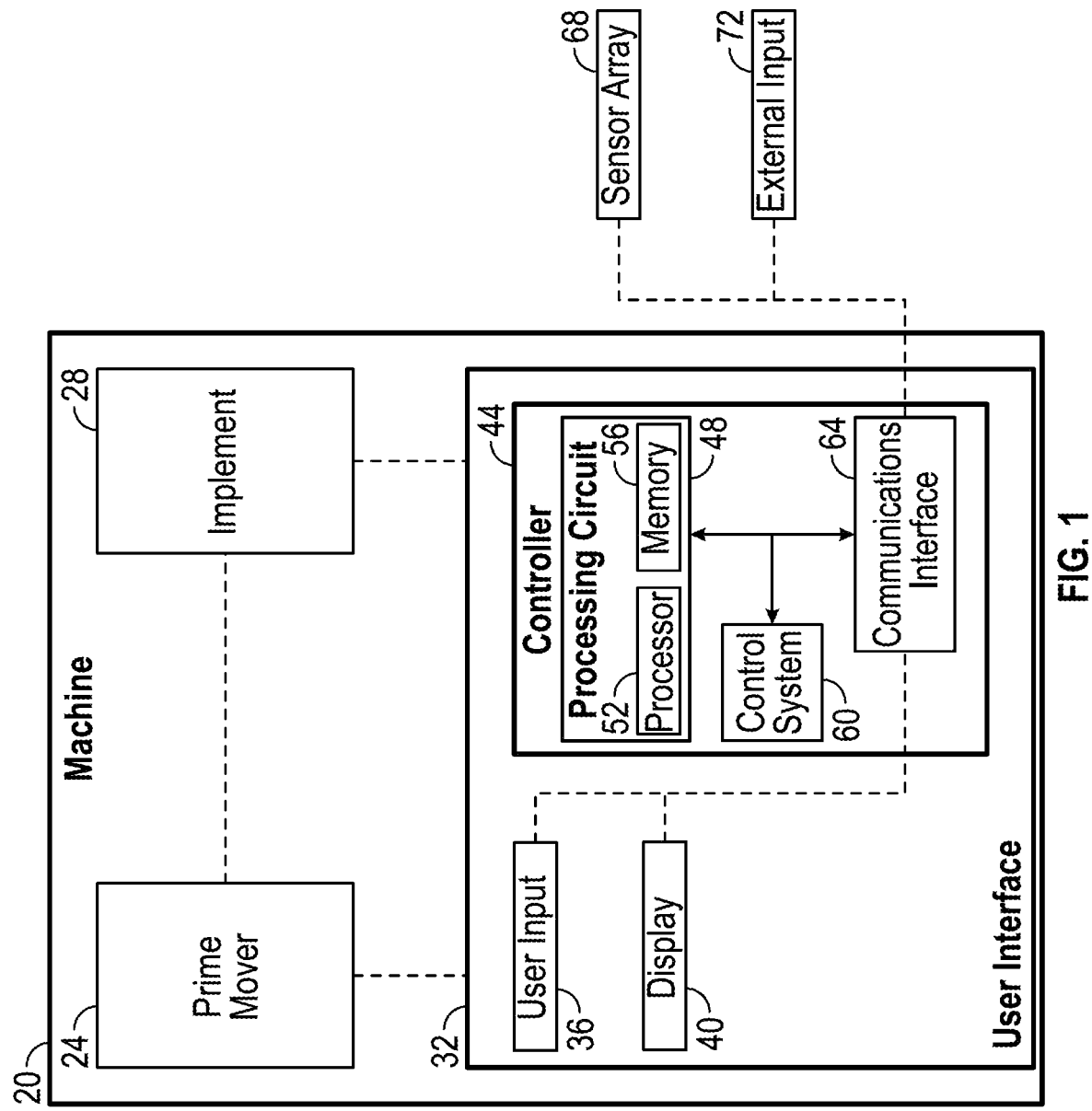
FIG. 1 is a schematic representation of a work machine including a machine control module according to some embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Work equipment such as lifts and telehandlers sometimes require tracking, tasking, monitoring, and servicing at a work site. It is therefore desirable to provide a means to quickly and effectively connect work machines with wireless digital services to assist a user in identifying a particular machine or a group of machines that match particular criteria and the status or state of each machine thereby saving time, improving efficiency, and reducing costs. It is also desirable to quickly identify and enable connected services for a particular work machine from a group of machines at a work site.

Referring to the figures generally, various exemplary embodiments disclosed herein relate to systems and methods for identifying multiple machines connected to a local fleet connectivity system. For example, a multiple machine identification system may include work machines configured with connectivity modules that may illuminate lights or generate sounds with a beacon or with the horn and lights of the machine itself when a user interacts with an application (e.g. an "identify my machine" application, an "identify machines near me" application, etc.). The multiple machine identification system may visually or audibly identify machines in a user selected group of machines at a work site. Using the beacons on the machines or the lights and horns of the machines, several machines can be identified at a time both digitally in an application and on the machine itself. The multiple machine identification system allows a user to pick a machine physically and tie it to the digital version of the machine stored in the multiple machine identification system or in a local fleet connectivity system with a multiple machine identification capability. The multiple machine identification system may save time searching for serial numbers and matching them to machines and documents. In another example, the multiple machine identification system may use beacon lights and beep the horns of machines in a group of machines at a work site to differentiate one machine from another. A user may use the multiple machine identification system to ensure the selection of local machines (e.g., machines within a distance of the user or within a distance of a task on a work site) that fit a user defined criteria (e.g. criteria may be that a machine is easiest to pull out of a staging area, has a full charge, found no faults, and is a specific model).

Further referring generally to the figures, various exemplary embodiments disclosed herein relate to systems and methods for interactivity and productivity that may enhance local fleet connectivity. For example, Bluetooth Low Energy (BLE) Machine to Machine (M2M) communication protocols may be used to expand communication at a worksite/jobsite via local connectivity between machines at the worksite/jobsite. In some embodiments, a local fleet connectivity system may include various work machines, interface modules, work site equipment, communications devices, communications networks, user interface devices, devices hosting local fleet connectivity system software, and user interfaces. Local fleet connectivity system users may include equipment user, equipment maintainers, equipment suppliers, worksite/jobsite supervisors, remote users, etc. The information provided to the local fleet connectivity system may be communicated to users via a user interface. In some embodiments, the user interface may include a real time map, showing a current machine location, a machine status. In some embodiments, the user interface includes a color coded warning indicator, an audible alarm, or another indicator structured to communicate to the machine operator that the work machine is in a location or state that requires the attention of the operator.

As shown in FIG. 1, a work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a lift boom, a scissor lift, a telehandler arm, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a control module 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the control module 44 includes a processing circuit 48 having a processor 52 and a memory device 56, a control system 60, and a communications interface 64. Generally, the control module 44 is structured to receive inputs and generate outputs for or from a sensor array 68 and external inputs or outputs 72 (e.g. a load map, a machine-to-machine communication, a fleet management system, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the equipment 20 relative to locations, maps, other equipment, objects or other reference points.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the control module 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment grouping. The process to automatically generate a work site equipment grouping automatically associates machines 20 connected on a near network to one or more other machines 20. In some embodiments, the automatic associations are based on rule stored on a work machine or on another network node. In some embodiments, the association rules are based on one or more of a work site designation, a location of a machine, or a code (e.g. a customer key, a manufacturer key, or a maintainer key).

Figure 2:
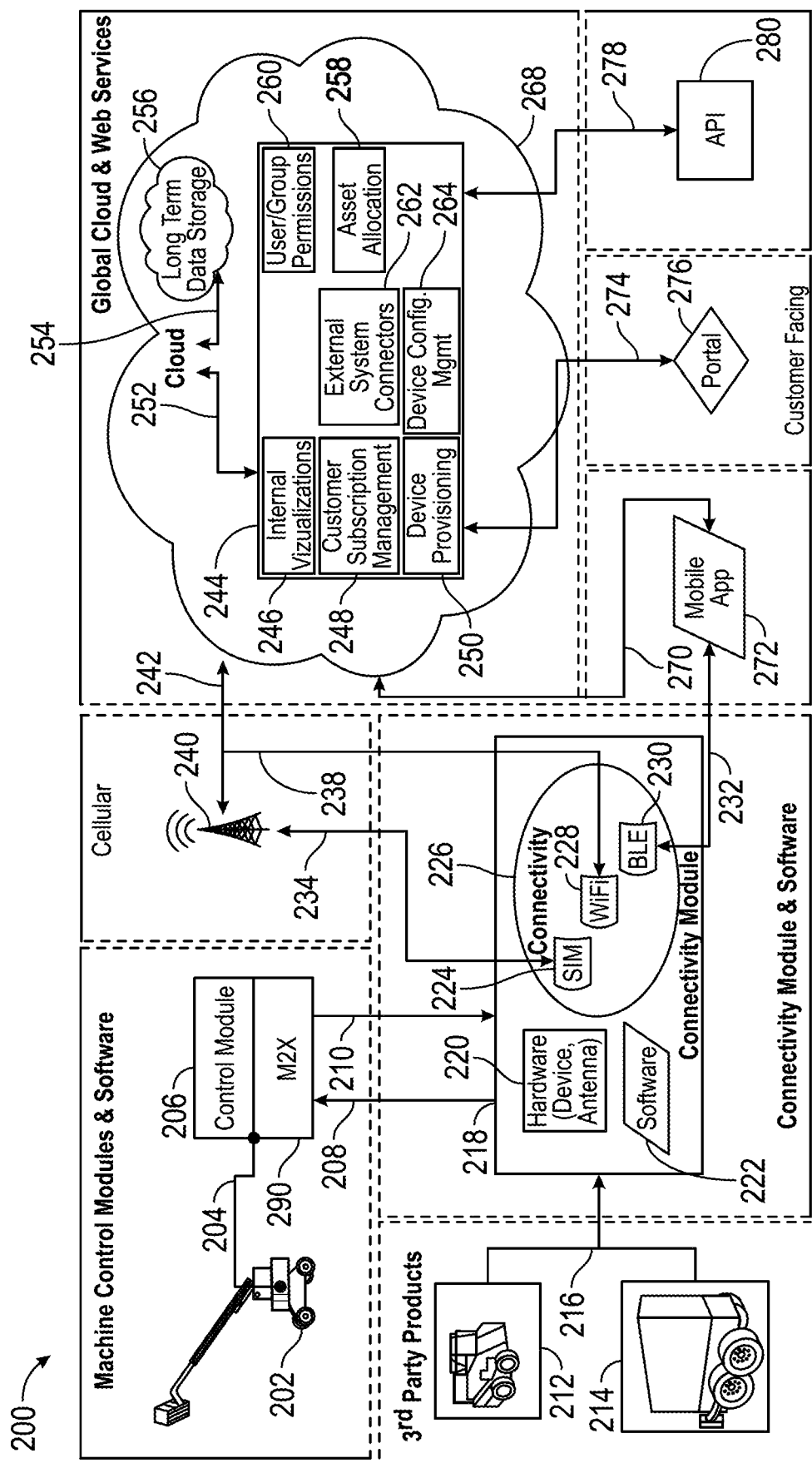
FIG. 2 is a schematic representation of a local fleet connectivity system, according to some embodiments.

As shown in FIG. 2, the local fleet connectivity system 200 is supported by a network of nodes. The network of nodes may include one or more work machines 202, each with a control module 206, one or more connectivity modules 218, and one or more network devices hosting, for example, user devices 272 including user interfaces, network portals 276, application interfaces/application programming interfaces 280, data storage systems 256, cloud and web services, and product development tool and application hubs 244.

The work machine 202 is communicably connected to a control module 206. The connection 204 between the work machine 202 and the control module 206 may be wired or wireless thus providing the flexibility to integrate the control module with the work machine 202 or to temporarily attach the control module 206 to the work machine 202. The control module 206 may be configured or may be reconfigurable in both hardware and software to interface with a variety of work machines 202, 212, 214 via the connectivity module 218. The control module 206 may comprise an integral power source or may draw power from the work machine 202 or another external source of power. Control modules 206 may be installed on or connected, e.g., via a connection 216, to products (e.g. third party products 212, 214) not configured by the original product manufacturer with a control module 206.

The work machine 202 communicably connects to the local fleet connectivity system 200 via a machine-to-X (M2X) module 290. The M2X module 290 is communicably connected to the control module 206. The M2X module 290 establishes one or more communications channels 208, 210 with a connectivity module 218. The connectivity module 218 provides a plurality of links between one or more work machines 202, 212, 214 and the local fleet connectivity system 200. Applications providing functions for the local fleet connectivity system 200 may be run by the M2X modules on one or more work machines 202. One or more user devices 272 may be configured to communicate (e.g., to exchange commands, codes (e.g. a customer key) and data) with the connectivity modules of one or more machines via a network connection, for example via a local wireless connectivity system or via a cellular networks (e.g., via cell towers 240) to form a network of interconnections among machines, devices, or nodes. Connections between machines and user devices in the local fleet connectivity system 200 may be provided by a wireless mesh network, for example.

The connectivity module 218 comprises hardware 220, further comprising antennas, switching circuits, filters, amplifiers, mixers, and other signal processing devices for a plurality of wavelengths, frequencies, etc., software hosted on a non-volatile memory components 222, and a communications manager 226. The communications manager 226 may comprise processing circuits with communications front ends 224, 228, and 230 for one or more signal formats and waveforms including, for example, Bluetooth, Bluetooth low energy, Wi-Fi, cellular, optical, and satellite communications. The connectivity module 218 may function as a gateway device connecting work machine 202 to other work machines 212, 214, remote computing systems 244, 272, 276, and 280, beacons, scheduling or other fleet management and coordination systems.

The local fleet connectivity system 200 allows for the coordination of multiple machines 202, 212, 214 within the same work site, or a fleet wide control. For example, a work machine 202 may remotely report the results of a self-inspection to a user via a user device 272.

The local fleet connectivity system 200 provides connectivity between work machines 202, 212, 214 and user devices 272 including remotely hosted user interfaces, network portals 276, application interfaces/application programming interfaces 280, data storage systems 256, cloud and web services 268, and product development tool and application hubs 244 that function as an Internet of Things (IoT) system for operation, control, and support of work machines 202, 212, 214 and users of work machines. Connections 232, 234, 238, 242, 252, 254, 270, 274, and 278 between nodes connected to the local fleet connectivity system 200 may comprise, for example, cellular networks (e.g., via cell towers 240), or other existing or new means of digital connectivity.

Product development tool and application hubs 244 may comprise tools and applications for internal visualizations 246, customer subscription management 248, device provisioning 250, external systems connectors 262, device configuration management 264, user/group permissions 260, asset allocation 258, fleet management, compliance, etc.

Figure 3:
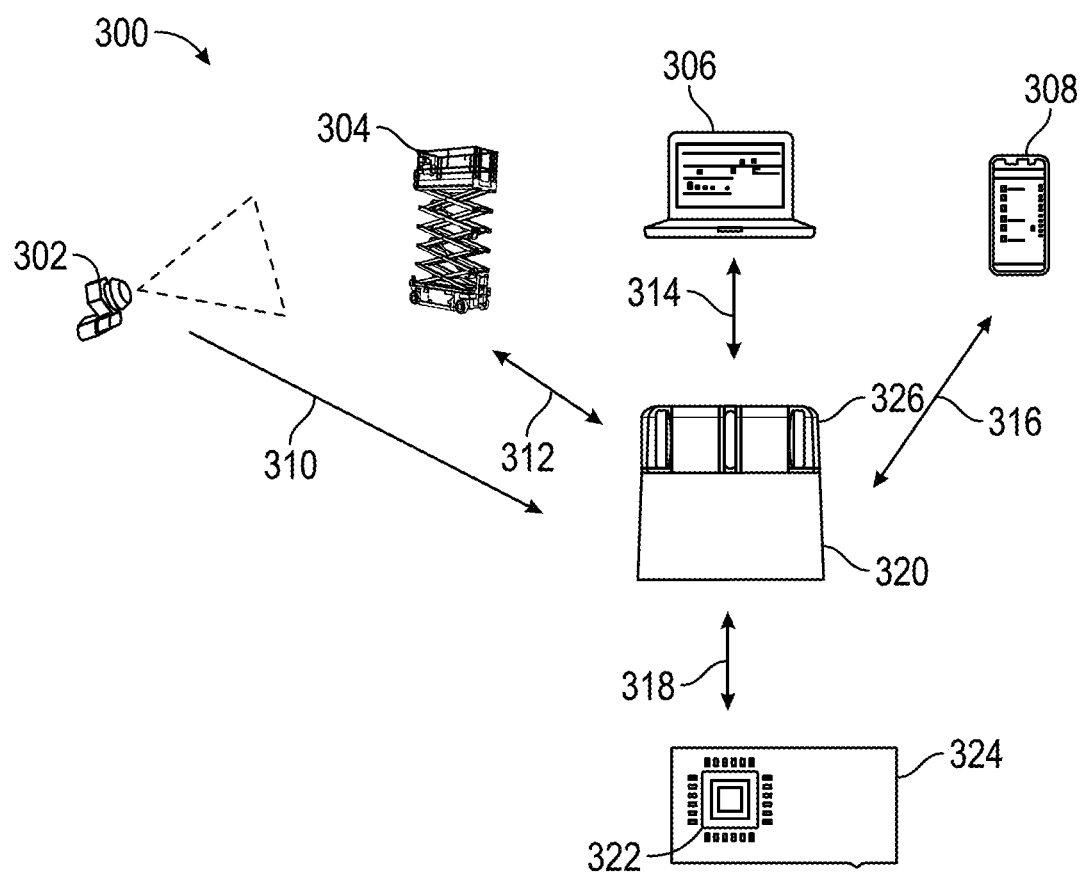
FIG. 3 is a schematic representation of a local fleet connectivity system with a central integration module, according to some embodiments.

FIG. 3 shows a local fleet connectivity system 300 according to an exemplary embodiment. As shown in FIG. 3, the connectivity module 320 is communicably connected to a machine controller functions as a communications interface between a control system 322 of the work machine 324 and other elements connected to the local fleet connectivity system 300. The connectivity module 320 may be part of the work machine 324 or may be physically coupled to the work machine 324. The connectivity module 320 may exchange commands and data 318 with the control system 322 of the work machine 324, sensor data 310 with auxiliary sensors 302, machine data 312 with another machine 304, sensor data with another machine 304, commands and data 314 with a node or portal 306, and commands and data 316 with a user device 308 running an application for the local fleet connectivity system 300. The connectivity module 320 may exchange commands, codes (e.g. a customer key) and data between work machines 304, 324, user devices 308, and/or nodes 306 to form a network of interconnections among machines, devices, or nodes.

In some embodiments, the connectivity module 320 is communicatively connected to a light attached to a work machine. The light may be a work machine light (e.g. a headlight) or a beacon 326 (e.g., an RGB LED light) coupled to the connectivity module 320. In some embodiments, the light is configured to emit light in one or more colors, intensities, patterns, etc. In some embodiments, the connectivity module illuminates the light responsive to a command from a remote user device communicatively connected to the connectivity module via a wireless connection. In some embodiments, the user device transmits the command to illuminate the work machine light responsive to user interaction with a local fleet connectivity application hosted on the user device. In some embodiments, the connectivity module illuminates the light and activates an audible indicator responsive to the command from the remote user device. In some embodiments, visual and audible indicators may be used in conjunction or independently of one another. In some embodiments, a plurality of connectivity modules illuminates the lights attached to a plurality of work machines responsive to a command from a remote user device communicatively connected to the plurality of connectivity modules via a wireless connection. In some embodiments, the plurality of lights attached to the plurality of work machines are illuminated simultaneously in response to a single command from the remote user device. In some embodiments, the local fleet connectivity system generates commands to a plurality of work machines designated by a user interacting with the local fleet connectivity application hosted on a user device to activate lights or audible indicators and electronically pair a work machine selected by a user from the plurality of work machines with a digital model of the selected work machine generated by the local fleet connectivity application on the user device. For example, a user may observe a group of work machines at work site. The user may command a subset of the group of work machines to activate lights on or attached to the work machines using an application on a user device (e.g. a "find me" application). The user may, through the user application, designate the subset of work machines to be identified based on criteria selected through the application. Through the application and user device connected to work machines on the local fleet connectivity network 300, the user may activate lights, horns or other indicators on several different work machines and may select variations on lights (e.g. different colors, different patterns, different intensities, etc.) to distinguish between machines and quickly identify the desired machine or group of machines (e.g. "find me" commands to multiple machines at the same time). The application provides options for a user to identify a machine physically (through observation of the light or a horn) and tie the identified machine to the digital model of the same machine generated by the application on the user device. For example, a user may tie a selected machine or group of machines identified physically by the user using the "find me" indications with a digital record for the machine (including serial number, service records), and access connected services for the machine available through the local fleet connectivity system (e.g. location, electronic commerce, use tracking, billing, maintenance support, etc.) all by means of In a further example, a user may apply additional criteria to machine identification commands. For example, a user input to the application criteria for machine states or conditions (e.g. fully charged, at least ½ fuel, no outstanding service issues, no faults detected on self-test, etc.), machine type (e.g. specific make, specific model, etc.), machine location (e.g. proximity to the user, proximity to a task, positioned for easiest movement out of a staging area, etc.). The provisions within the local fleet connectivity application and network for physically identifying machines and tying them to matching digital models including full digital machine records provides significant savings of time searching machines and manually confirming records (e.g. machine serial numbers). In a further example, a user may simultaneously communicate with a plurality of machines (e.g. directly using a mesh, Wi-Fi, or other local connection or remotely via a cloud network connection) that satisfy one or more selected criteria (e.g. machines that are the same model) and command them via the local fleet connectivity application to separately identify themselves (e.g., with different color lights). The user may then select the "green machine" indicated via the application user interface, the machine may flash its lights to indicate "this one" and the user can then tap an indicator in the application to verify machine selection and electronically pair a user device with that machine. The user may then access or enter information for selected machines and share the information with other devices connected to the local fleet connectivity system through the application.

For example, in response to a user selection on an application hosted on the user device 308, one or more machines can be located and/or identified by one or both of a visual or audible signal from the selected machine or from the connectivity module coupled to the machine. In some embodiments, the connectivity module 320 may include one or both of a light or sound generator and may be configured to identify a machine by generating one or both of a visual or audible signal (e.g. alerts, indications, etc.). For example, the connectivity module 320 may include a beacon 326 with a light (e.g., an RGB LED light) which is lit when a user presses a button on an application (e.g. an identify-my-machine application on a user device 308). Additionally or alternatively, the connectivity module 320 may be communicatively coupled to one or more lights (e.g., headlights, cabin lights, an incandescent light, a light emitting diode, a fixed beacon, a flashing beacon, a rotating beacon, a laser, a light array, etc.), display devices, or markers, etc. of the work machine 324 (e.g., via the control system 322) and can instruct the lights, devices, markers, etc. to generate the visible signals in response to the selection of a button on the user device 308. The beacon 326 may additionally or alternatively include a speaker to provide the audible signals. Additionally or alternatively, the connectivity module 320 may be communicatively coupled to a horn or speaker of the work machine 324 (e.g., via the control system 322)

and can instruct the horn or speaker to generate the audible signal in response to the selection of a button on the user device 308

The local fleet connectivity system 300 may allow a user to identify multiple machines of a plurality of machines. Each machine may include a connectivity module 320 that is part of or physically coupled to the machine (e.g., machine 324). The connectivity module may be communicatively coupled to the control module 322 of the machine and may be configured to communicate with the other connectivity modules via a network connection. A user may use a user device (e.g., user device 308) configured to communicate with the one or more connectivity modules via a network connection. A user may make selections of machines using an application on the user device. In response to the selection, the selected devices can be identified by one or both of an audible signal or a visual signal. For example, if a user selects machines 304 and 324 via the user device 308, machines 304 and 324 may generate an audible or visual signal using their respective horns, headlights or a machine state visual indicator coupled to the respective connectivity unit. In some embodiments, each machine is identified by a different visual or audible signal. For example, if the connectivity modules of the two or more machines each comprise a light configured to illuminate to generate the visual signal, the light of each connectivity module of the two or more machines may illuminate with a different color.

In some embodiments, the user may make a selection of machines by dynamically filtering the plurality of machines according to one or more selectable attributes or criteria. The selectable attributes or criteria may include, for example, one or more of a machine type, a battery status, a machine model number, a machine manufacturer, a machine location, a machine work site tag, a machine status, a repair status, a DTC status, a fuel status, a use status, or the number of other machines that must be used to access or move a machine. In some embodiment, the user device displays a map showing the locations of the plurality of machines. Machines that do not match the filter criteria may be temporarily removed from the map.

Figure 4:
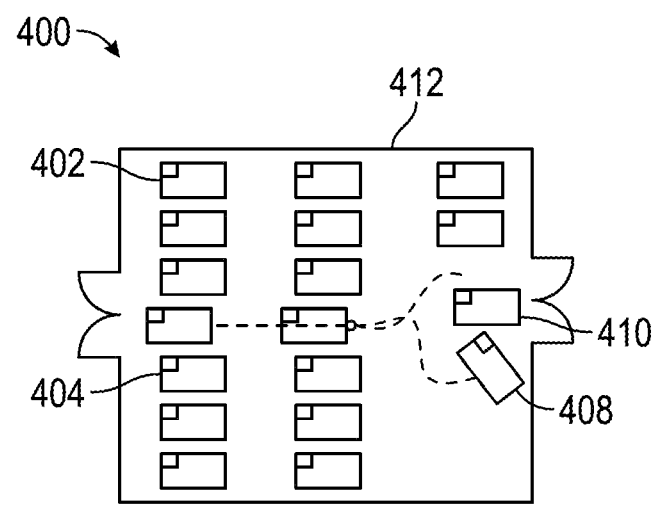
FIG. 4 is a schematic representation of a work site and equipment staging area with a local fleet connectivity system deployed, according to some embodiments.

As described in further detail in FIG. 4, in some embodiments, the user may select a user-selected first machine and a location that the user-selected first machine is to be moved to. The application on the user device may automatically determine one or more other machines that are required to be moved in order to move user-selected first machine to the selected location. For example, if a user selects a scissor lift in a corner of a room, that cannot be moved to a desired location without moving a boom lift out of the way, the application may automatically select the boom lift and the both the scissor lift and boom lift may generate a visual or audible signal. In some embodiments, a control module of each of the automatically selected machines may be configured to receive instructions via the connectivity module of the associated machine and to control and move the associated machine out of a path of the user-selected first machine to the selected location. Thus, the machines may be configured to move automatically, based on instructions from the user device and or other computer systems connected to the local fleet connectivity system 300, to allow the user-selected first machine to move to the selected location. The machines may also communicate with each other through their respective connectivity modules to, e.g., avoid collisions between machines.

In some embodiments, the beacon 326 may function as a machine state visual indicator. The beacon may provide a signal to an observer. The signal may indicate a state or condition of the machine (e.g. power on, power off, in operation, fuel level, electrical system state of charge, diagnostic trouble code (DTC) status, maintenance required). In other examples, the machine state visual indicator may be a machine component or a separate device attached to the machine (e.g. a vehicle external light, a vehicle internal light, a beacon, etc.). The machine state visual indicator may be a light (e.g. an incandescent light, a light emitting diode, a fixed beacon, a flashing beacon, a rotating beacon, a laser, a light array, etc.), a display device, a marker, etc. In some examples, an audible indicator of a machine state The machine state visual indicator is configured to generate a variety of visual signals. In some examples, the variety of visual signals comprises one or more colors, patterns, and combinations of colors and patterns. In some examples, the machine state visual indicator is configured to generate visual signals observable as a light or one or more light patterns. In some examples, the light patterns generated by the machine state visual indicator can be varied in any optical characteristic (e.g. color, wavelength, intensity, pulse duration, direction, etc.).

Visual signals generated by the machine state visual indicator show various states, conditions, and criteria of the machine. The visual signals may indicate, for example, one or more machines on a work site that have sufficient fuel levels to perform a task. In other examples, the visual signals generated by the machine state visual indicator illustrate predefined or user configurable machine states for the local identification of that state. For example, a scissor lift machine 304 can flash a beacon light indicating that it requires a charge. In some embodiments, the visual signal may be initiated in response to a local user command entered by a user at a user device 308, a remote user command, a machine to machine command, a condition or state detected by a machine onboard sensor, or a controller 322 logic determination.

In some embodiments, machine onboard sensors detect a state or condition of the machine 324. The machine controller 322 determines a command to the connectivity module 320 or directly to the machine state visual indicator to display one or more visual signals. In some embodiments, the machine state visual indicator illuminates a colored light signal corresponding to a machine state or condition. For example, a work site supervisor may select green to indicate a fuel level above ¾ of capacity, yellow to indicate a fuel level between ¾ and ¼, and red to indicate a fuel level below ¼. In another example a service technician may transmit a wireless command to all machines on a work site to flash a red light if the machine controller detects a battery charge below a user specified level.

In some embodiments, a machine state visual indicator application hosted on a user device 308 presents a user interface to a user. The application user interface receives user selections of a criterion for a machine state and a visual signal corresponding to the criterion. For example, a user selects state of charge as a criterion for electric powered scissor lift machines 304 on a work site and one or more state visual indicator signals (e.g. a colored light) corresponding to one or more state of charge conditions. The user inputs are transmitted to machines 304, 324 via a network. User inputs received at the connectivity module 320 generate one or more commands to the machine visual state indicator. Each machine state visual indicator for the machines at the work site then respond to the user input by displaying light beacon with a color representing a status of that machine for the selected criterion (e.g., Machines with good charges show green lights, machines requiring a recharge show yellow lights, and machines requiring battery replacement show red lights.).

The machine status visual indicator is configurable to function when machine power is off. For example, the machine status visual indicator may receive user inputs via a Bluetooth low energy (BLE) signal received at the connectivity module 320. The BLE communications path can be configured to remain always active with power input from a machine power source (e.g. a battery). In some examples, the BLE communications channel in the connectivity module 320 remains open and the machine state visual indicator is available to display a visual signal in response to a user input in a power saving mode (e.g. modified receiver duty cycles, reduced communications/BLE intervals, lower power operation of the machine state visual indicator beacon).

In some embodiments, the local fleet connectivity system 300 may support commercial services. In some embodiments the local fleet connectivity system includes one or more applications hosted on one or more processors. Host processors may comprise a machine controller 322, a connectivity module controller, and a user device controller. In some examples, commercial services supported by the local fleet connectivity system 300 may comprise advertising, user preference identification, point of sale, third-party messaging, etc. In some examples, an application hosted on one or more of a machine controller and a user device may generate user interfaces for commercial services. In some examples, the application may generate one or more of audio, visual, and tactile signals to convey messages associated with commercial services. In some examples, the application may be configured to display recommended purchases to the user based on the state or condition of the machine connected to the local fleet connectivity system or a parameter associated with a user of the equipment identity system. In some examples, the application may provide point of sale services (e.g. order entry, payment acceptance, order tracking, etc.).

Further referring to FIG. 3, in some embodiments, the local fleet connectivity system 300 may comprise electronic commerce functions. In some examples, electronic commerce functions are accessed through a tab or page within the application, a click-through popup within the application, a scrolling banner within the application, a push notification, etc. In some examples, the electronic commerce functions provided through the local fleet management system 300 may be managed by an electronic commerce application hosted on a controller installed in a machine 304, 324 or a user device 308. Electronic commerce functions provided through the local fleet connectivity system may comprise, for example, original equipment manufacturer advertising (e.g. service kits, equipment consumables, replacement parts based on a status or condition of a machine). In some examples, electronic commerce messages are transmitted via the equipment identity system. Electronic commerce messages may comprise, for example, messages based on a specific machine or machines being accessed, a profile or a nature of a person accessing the specific machine or machines, weather or local conditions around the machine or machines, conditions or states associated with the machine (e.g., engine hours, fault codes, etc.), location of the machine, location of the work site, proximity of a vendor to a work site, etc. In some examples, the application is a point of sale portal for purchasing items or services identified in electronic commerce messages. For example, an original equipment manufacturer OEM) may determine a work machine component requires replacement based on the condition of the component as detected by a sensor on the work machine and reported to the OEM via the equipment identity system. The OEM may locate the nearest replacement part, determine a price and delivery time for the part and generate a push message to a user on a user device at a work site identifying the need to replace the component, the price and arrival time for the replacement component, a purchase incentive for ordering the component through the application, process the order through the user device, and provide post sale services (e.g. delivery status, installation instructions, warranty support) through the application.

In some examples, the electronic commerce functions supported through the applications may include third party advertising and point of sale. For example, the electronic commerce application may provide notifications to equipment users from a restaurant in proximity to a work site based on one or more parameters collected by the application. Parameters collected by the application may comprise for example, a number of users present at a work site, a time of day, a purchase incentive from a vendor, user preferences, etc. The application may, for example, capture a record of sales conversions in response to application electronic commerce messaging as a basis for revenue calculation for a sales channel supported by the electronic commerce functions enabled by the local fleet connectivity system 300.

Further referring to FIG. 3, in some embodiments, the machine controller 322 is configured to receive data from a first pressure sensor on the machine. The machine controller 322 determines a vertical location component for a machine position. In some examples, the machine controller 322 is configured to determine the position of the machine 324 with respect to a floorplan of a work site (e.g. the position of the machine is identified with a floor of a structure in which the machine is located). In some examples, the machine controller 322 determines the position of a machine on a network (e.g. a mesh network) with respect to a mobile user device 308 or another machine 304. In some examples, the machine controller 322 receives pressure sensor data from a second sensor at a load (platform/forks/etc.) relative pressure difference between chassis and can be used for elevation verification or calculation as well.

Further referring to FIG. 3, in some embodiments, a controller 322 is configured to determine a relative height differential between a first pressure sensor and a second pressure sensor. The first pressure sensor measures a first pressure measurement at a first location and the second pressure sensor measures a second pressure at a second location. In some examples, the first pressure sensor is provided on a first machine 324 and communicatively connected to the controller 322. In some examples, the second pressure sensor is an off board (i.e. not located on the first machine) sensor. The second pressure sensors may be provided, for example, on a user device 308 (e.g., a phone), a second machine 304, a load, an implement, a work site hub device, etc. In some examples, the second pressure measurement at the second pressure sensor may be transmitted to the controller 322 of the first machine 324 via a direct local connection (e.g. a BLE connection, a Wi-Fi connection, etc.). In some examples, the second pressure measurement is transmitted by the second sensor to the controller 322 via a network connection. In some examples, the controller 322 may determine the local relative height differential between the first pressure and the second pressure sensor. The controller may, for example, transmit the relative local height differential to other machines connected to a local network via the connectivity module. In some examples, the relative pressure difference between a first pressure sensor attached to a chassis of the machine and a second pressure sensor attached to an implement or located at a load (e.g. a platform, a set of forks of a forklift, etc.) may transmit a first pressure measurement and a second pressure measurement to the controller 322. In some examples, the controller 322 may use the first pressure measurement and the second pressure measurement to calculate or verify a height of the implement or the load. The controller may, for example, use the calculated or verified height of the implement or the load as a safety check within a height safety application supported by the work site network.

In some examples, a machine 324 may be configured with a first pressure sensor on the base of the machine and a second pressure sensor on the platform of the machine. The controller 322 may receive a first pressure measurement from the first pressure sensor and a second pressure measurement from the second sensor. The controller 322 may dynamically determine an operational height of the platform of the machine based on the difference between the first pressure measurement and the second pressure measurement. The operational height of the platform may be transmitted, for example, to other machines 304 connected to the local network 312, to a remote processor 306 via a network connection, to a work site hub device. In some examples, the operational height of the platform may be provided for external consumption by other devices connected to the network or used as part of the machine's 324 local controls.

The local fleet connectivity system 300 further allows for the coordination of multiple machines 304, 324 within the same work site, or a fleet wide control. For example, if a first work machine 324 is required to accomplish a task collaboratively with a second work machine 304, a user interacting with a user device 308 may provide commands to the first work machine 324 and second work machine 304 to execute the task in collaboration.

As shown in FIG. 4, the local fleet connectivity system 400 may be deployed at a work site 412 to control a fleet of work machines 402, 404, 408, 410 via the connectivity module 406 to collaboratively perform tasks requiring more than one work machine 408, 410. For example, a user may wish to move the work machine 410 from its stored position on the left of the work site 412 out the door on the right of the work site. The connectivity module may communicate with both the work machine 408 and the work machine 410, causing the work machine 408 to move out of the way of the work machine 410, so that the work machine 410 can move past the work machine 408 and out the doorway.

Figure 5:
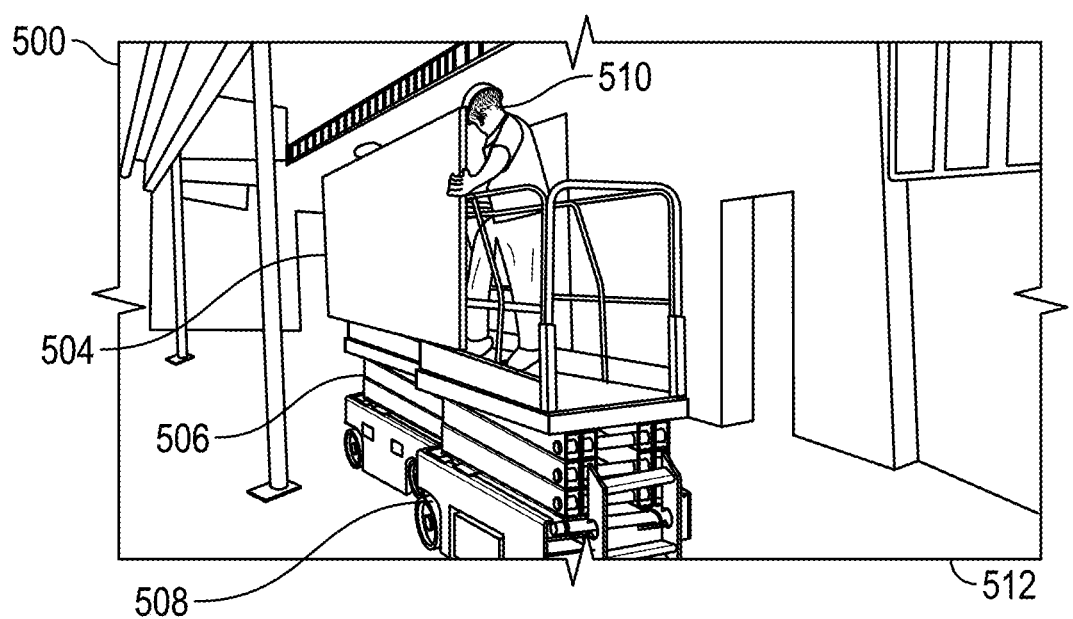
FIG. 5 is a picture representation of a work site with a local fleet connectivity system connecting two pieces of equipment, according to some embodiments.

As shown in FIG. 5, a plurality of work machines 506, 508 connected to local fleet connectivity system 500 may collaboratively perform tasks on a jobsite 512 requiring more than one work machine, for example emplacing a section of drywall 504 that is too large to be handled by a single work machine. A user device may communicate with both the work machine 506 and the work machine 508 and cause them to move at the same speed and in the same direction so that a user 510 on each machine 506, 508 can hold the drywall 504 while the machines 508, 506 are moving. Connectivity between the machines 508, 508 and with the local fleet connectivity system 500 can prevent the machines 508, 506 from being separated so that the users 510 do not drop the drywall 504.

Figure 6:
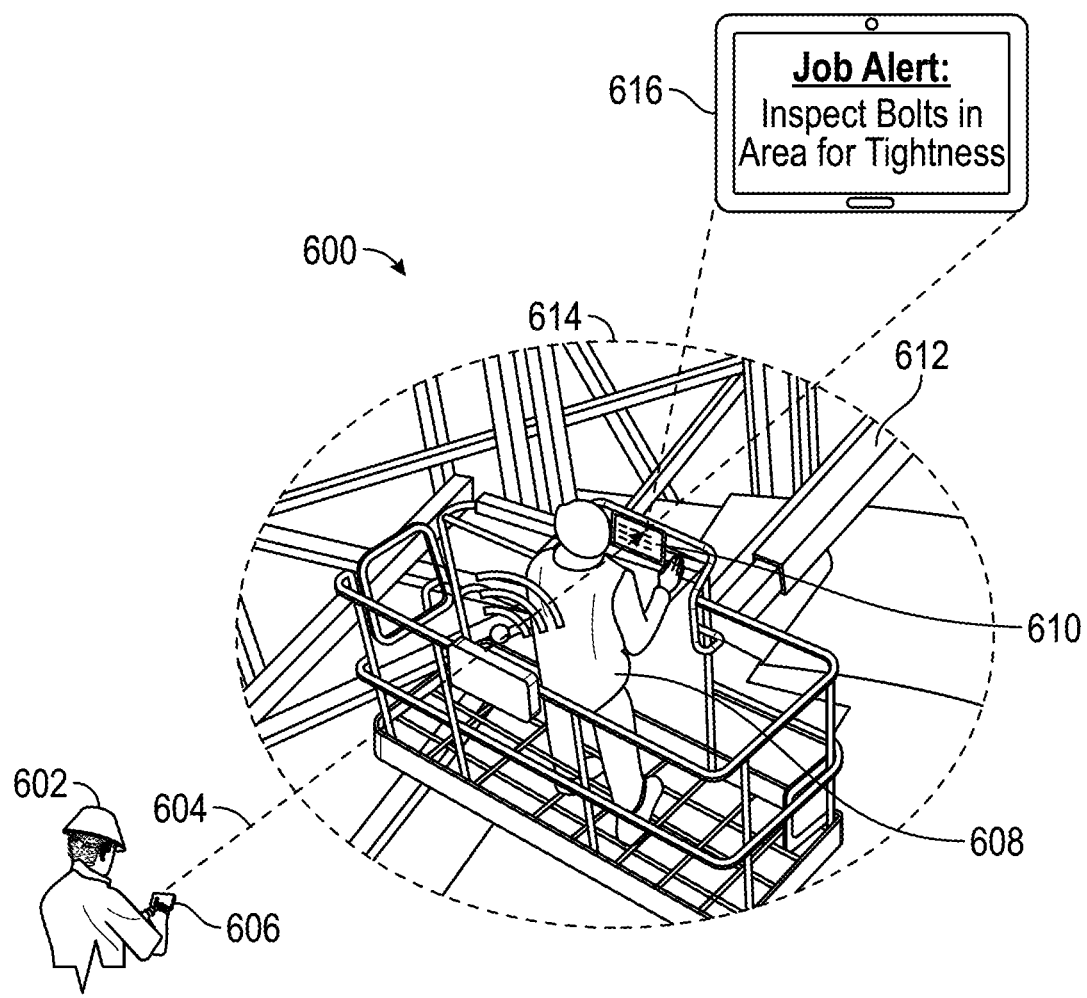
FIG. 6 is a picture representation of a piece of equipment with a local fleet connectivity system providing connectivity to a remote user, according to some embodiments.

As shown in FIG. 6, a remote user 602 of a local fleet connectivity system 600 can send messages and data 604 from a remote device 606 to an onsite user 608 on a jobsite 614. The messages and data 604 may be received by the control system 610 of a work machine 612 and displayed via a user interface on an onboard display 616. The remote user 608 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send.

Figure 7:
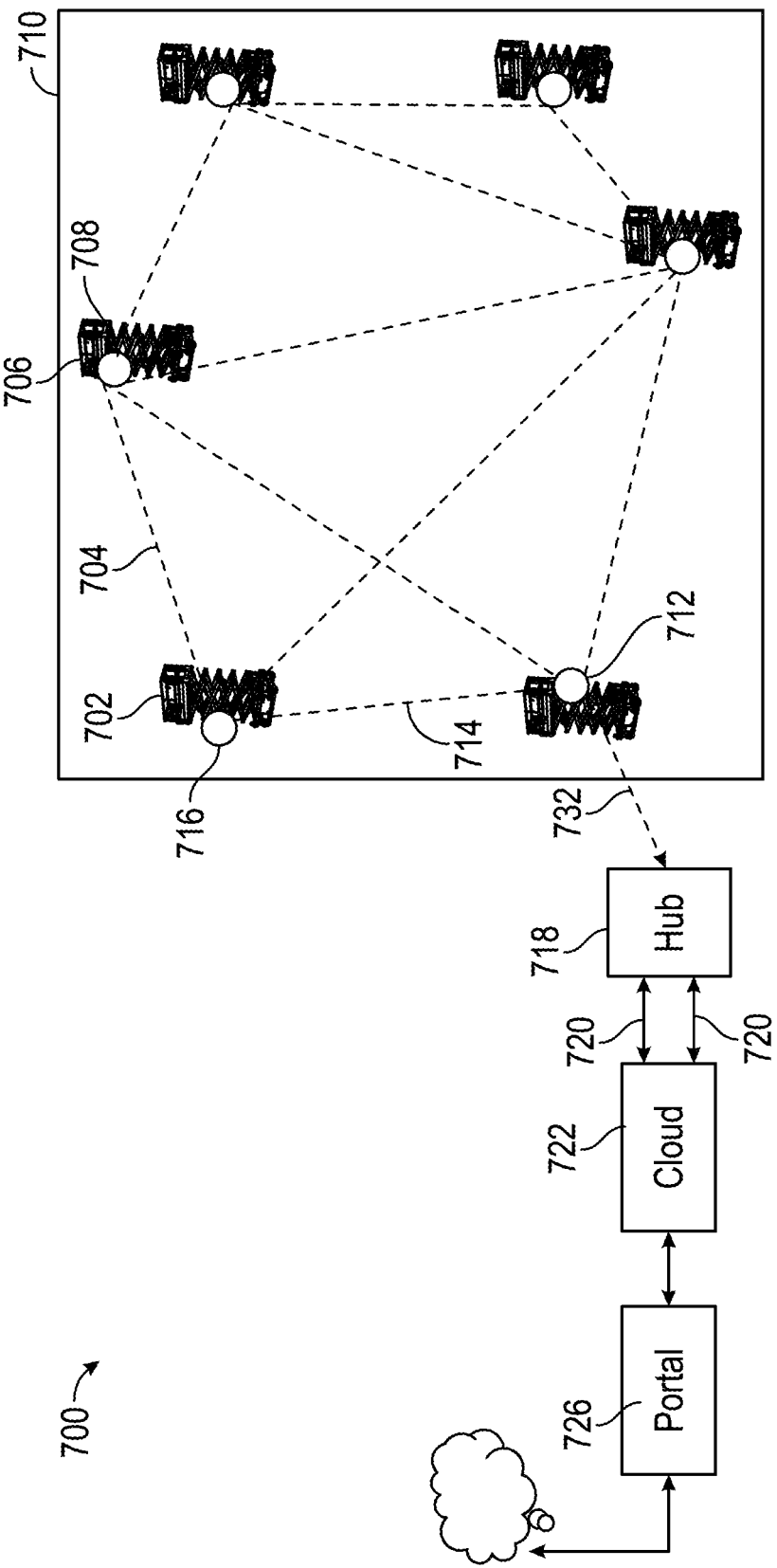
FIG. 7 is a schematic representation of a work site with a local fleet connectivity system deployed with connectivity to off-site systems, according to some embodiments.

Referring to FIG. 7, a local fleet connectivity network system 700 includes a connectivity hub 718. In some embodiments, the connectivity hub includes a connectivity module. In some embodiments, the connectivity hub is configured to communicatively connect with one or more connectivity module equipped machines 702, 706 in proximity to the connectivity hub 718. In some embodiments, the connectivity hub is configured to broadcast a work site identification signal. In some embodiments, the connectivity hub is configured to connect work site machines 702, 706 connected to the local fleet network to an external internet feed 720. In some configurations, the connectivity hub is configured as a gateway to one or more communications systems or network systems to enable exchanges of data 720, 722 between nodes 708, 712, 716 on the work site 710 local fleet connectivity mesh network 704, 714, 732 and nodes 726 external to the work site.

In some embodiments, connectivity hub has a connectively module to (a) provides the functionalities described here in place of or in addition to a machine that has a connectivity module, (b) broadcasts a site identifier, or (c) connects to an external internet to flow through data to and from the jobsite that is provided across the mesh.

Figure 8:
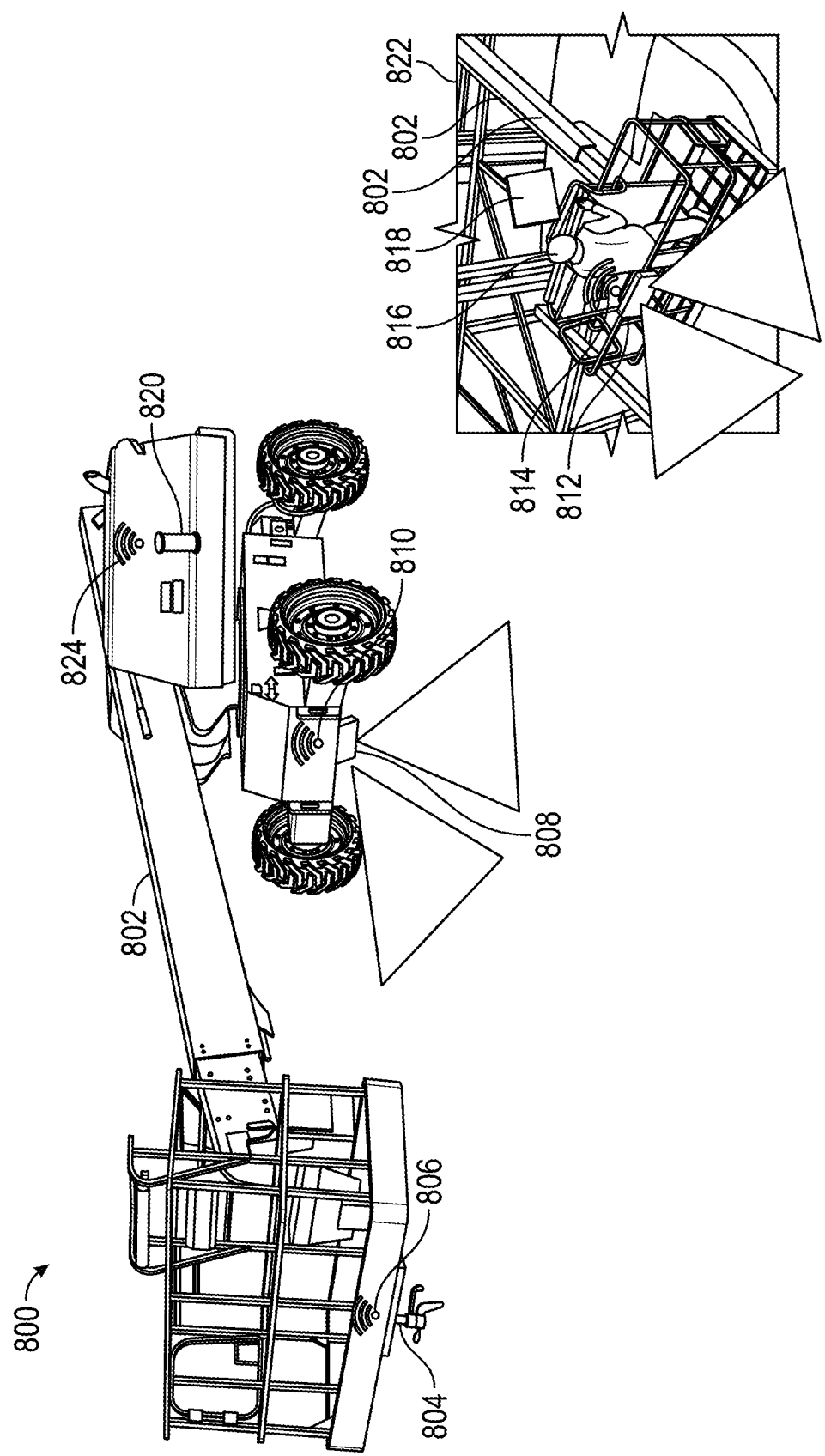
FIG. 8 is a picture representation of an apparatus configured with a local fleet connectivity system, according to some embodiments.

Referring to FIG. 8, a sensor network system 800 is shown. Sensors 804, 808, 812, 820 may be coupled to a work machine 802 on a jobsite 822. The sensors may be, for example, object detection sensors 808 812, environmental sensors 804 (e.g., wind speed, temperature sensors), and tagged consumable sensors 820. The sensors 804, 808, 812, 820 may be connected to and may send data to a local fleet connectivity system via wireless connections 806, 810, 814, 824. The sensor data may displayed or may be used to generate messages for display on an onboard display 818 for a user 816 of the work machine 802. The onboard display 818 may receive the sensor data via a direct wired or wireless connection to the sensors. Alternatively the sensors may communicate with the onboard display through the local fleet connectivity system (e.g., via a connectivity module 218). Sensor data from various work machines may be combined to map the jobsite 822 and to determine if environmental conditions are safe for using the work machines. Sensor data from the tagged consumable sensors 820 may be used to determine, for example, when tagged consumables must be replaced.

Figure 9:
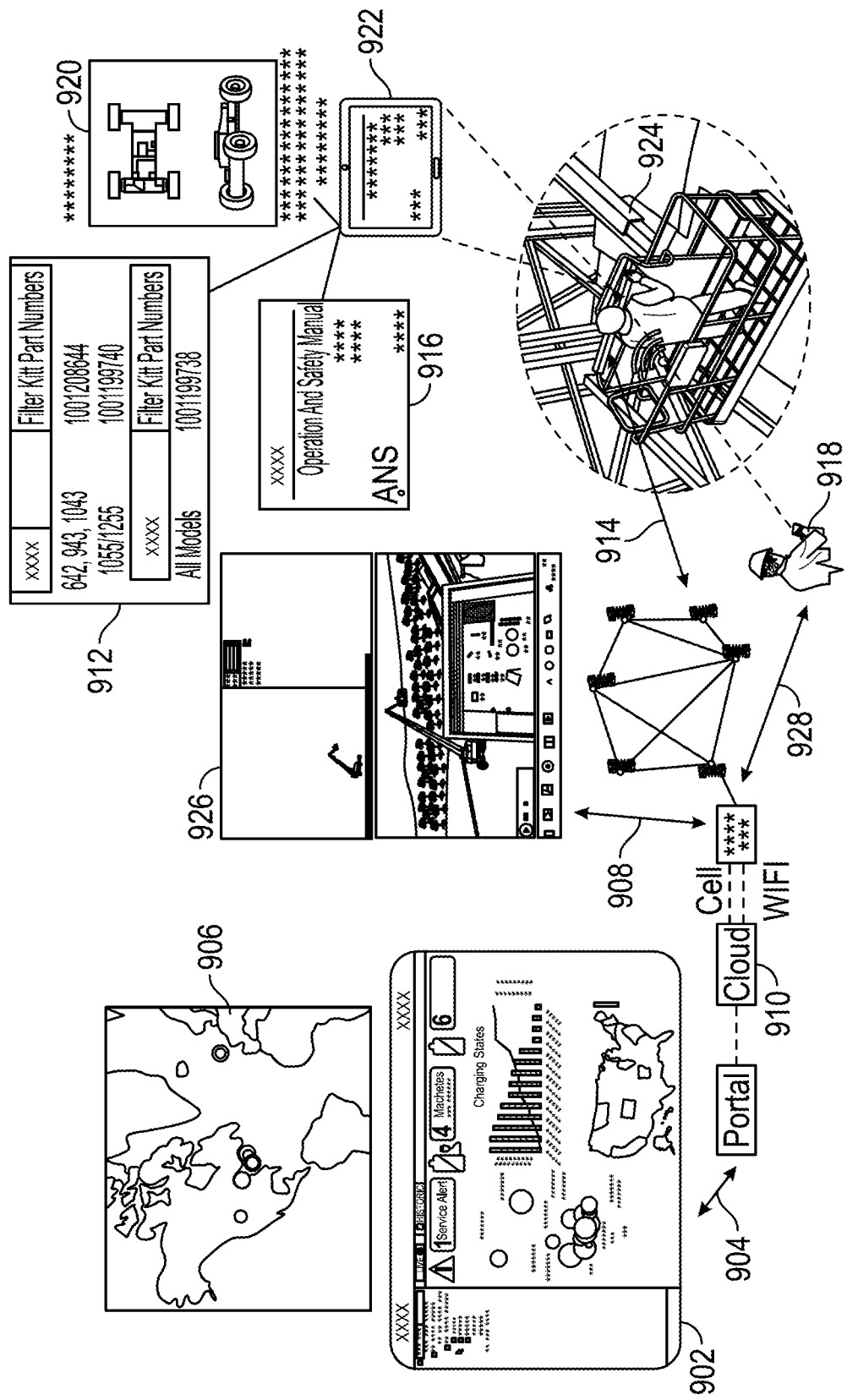
FIG. 9 is a graphical user interface of the local fleet connectivity system of FIG. 2, according to some embodiments.

As shown in FIG. 9, various user interfaces are available to be displayed on a remote user device 918 and an onboard display 922 of a work machine 924. A connectivity hub 910 may send and receive data 928, 908, 904 914 including the user interfaces 902, 906, 912, 916, 926, 920. The user interface 906 is a heatmap of locations of a plurality of work machines. The user interface 902 is a machine status display that shows the battery level, location, and alerts relating to a plurality of work machines. User interface 926 shows a digital twin of a work machine that updates based on sensor data of an associated work machine. User interface 912 is a list of part numbers for the work machine 924. User interface 916 is an operation and safety manual for the work machine 924. User interface 920 is a detailed schematic of the work machine 924.

Figure 10:
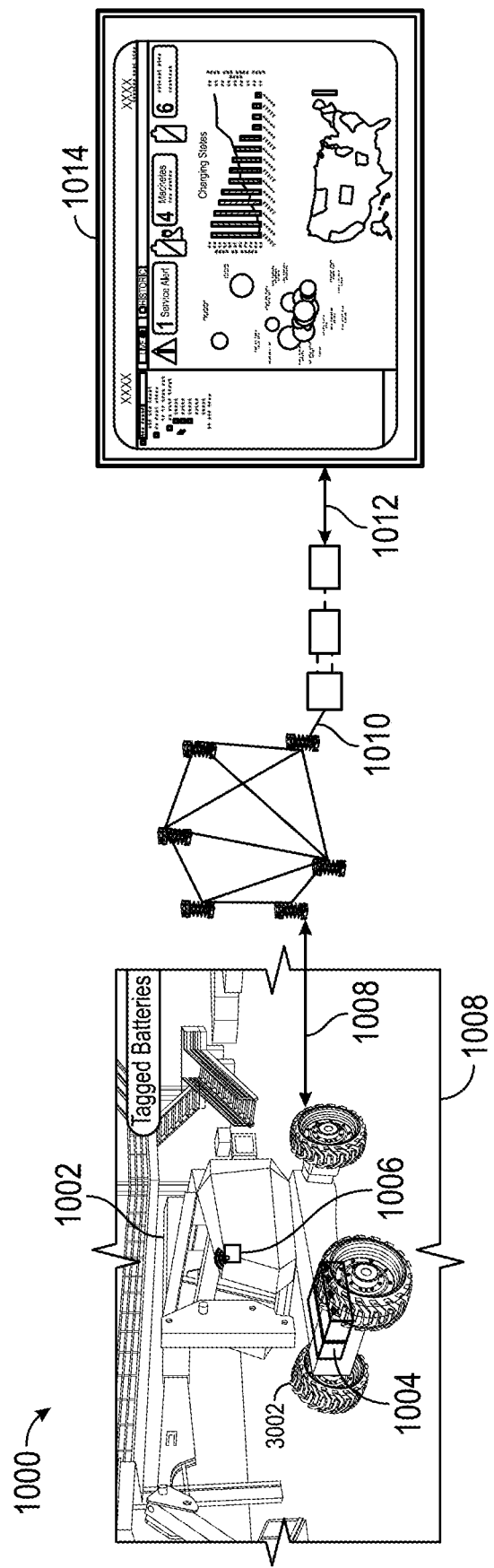
FIG. 10 is a picture representation of a work machine with machine specific output data connected to the local fleet connectivity system of FIG. 2

As shown in FIG. 10, a tagged consumable tracking system 1000 is shown. A work machine 1002 on a jobsite 1008 includes tagged consumables 1004 (e.g., batteries connected to battery charger 1006). The machine 1002 sends and receives data 1008 to and from the connectivity hub 1010. The connectivity hub 1010 sends and receives data 1012 to and from a user interface 1014. Data regarding the tagged consumables 1004 may be communicated to the user interface 1014 via the connectivity hub 1010. For example, battery charge state and battery health may be sent to the user interface 1014. When the battery health falls below a predetermined state, for example, when the battery is only able to hold half of its original charge, the connectivity hub 1010 may send an alert to the user interface 1014 indicating that the battery should be replaced.

Figure 11:
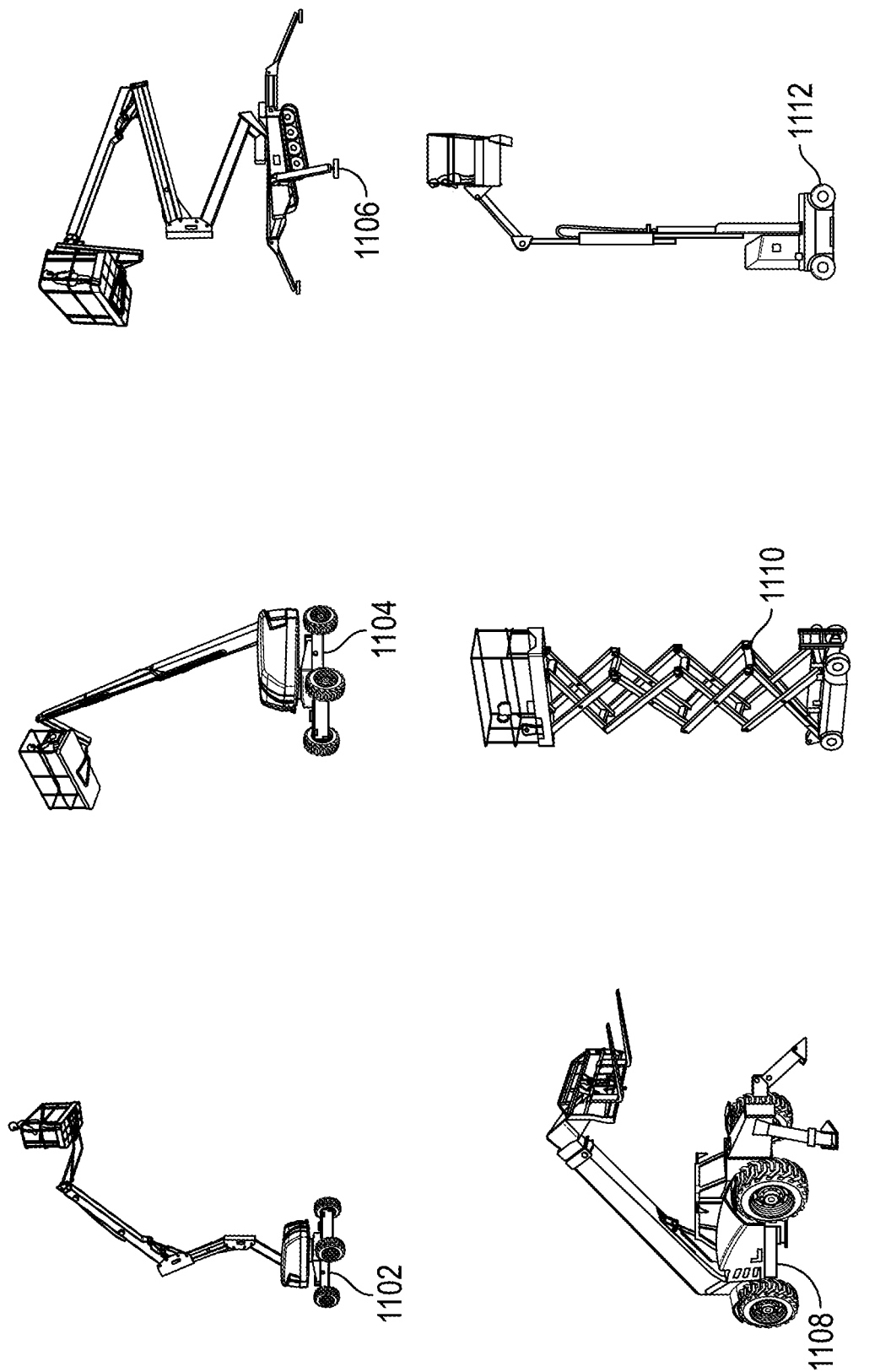
FIG. 11 is a picture representation of work machines configured for use in the local fleet connectivity system of FIG. 2.

FIG. 11 shows various embodiments of a work machines 20 (e.g., lift devices including articulating boom lift 1102, telescoping boom lift 1104, compact crawler boom list 1106, telehandler 1108, scissor lift 1110, toucan mast boom lift 1112). As an example, telescoping boom lift 1104 includes a chassis (e.g., a lift base), which supports a rotatable structure (e.g., a turntable, etc.) and a boom assembly (e.g., boom). According to an exemplary embodiment, the turntable is rotatable relative to the lift base. According to an exemplary embodiment, the turntable includes a counterweight positioned at a rear of the turntable. In other embodiments, the counterweight is otherwise positioned and/or at least a portion of the weight thereof is otherwise distributed throughout the work machines 20 (e.g., on the lift base, on a portion of the boom, etc.). As shown in FIG. 11, a first end (e.g., front end) of the lift base is supported by a first plurality of tractive elements (e.g., wheels, etc.), and an opposing second end (e.g., rear end) of the lift base is supported by a second plurality of tractive elements (e.g., wheels). The front tractive elements and the rear tractive elements include wheels of telescoping boom lift 1104; however, in other embodiments the tractive elements include a track element.

As shown in FIG. 11, the boom of telescoping boom lift 1104 includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment (e.g., articulating boom lift 1102), the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

As shown in FIG. 11, the lower boom of telescoping boom lift 1104 has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). The boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

As shown in FIG. 11, the upper boom of telescoping boom lift 1104 has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom of telescoping boom lift 1104 includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. The boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

Figure 12:
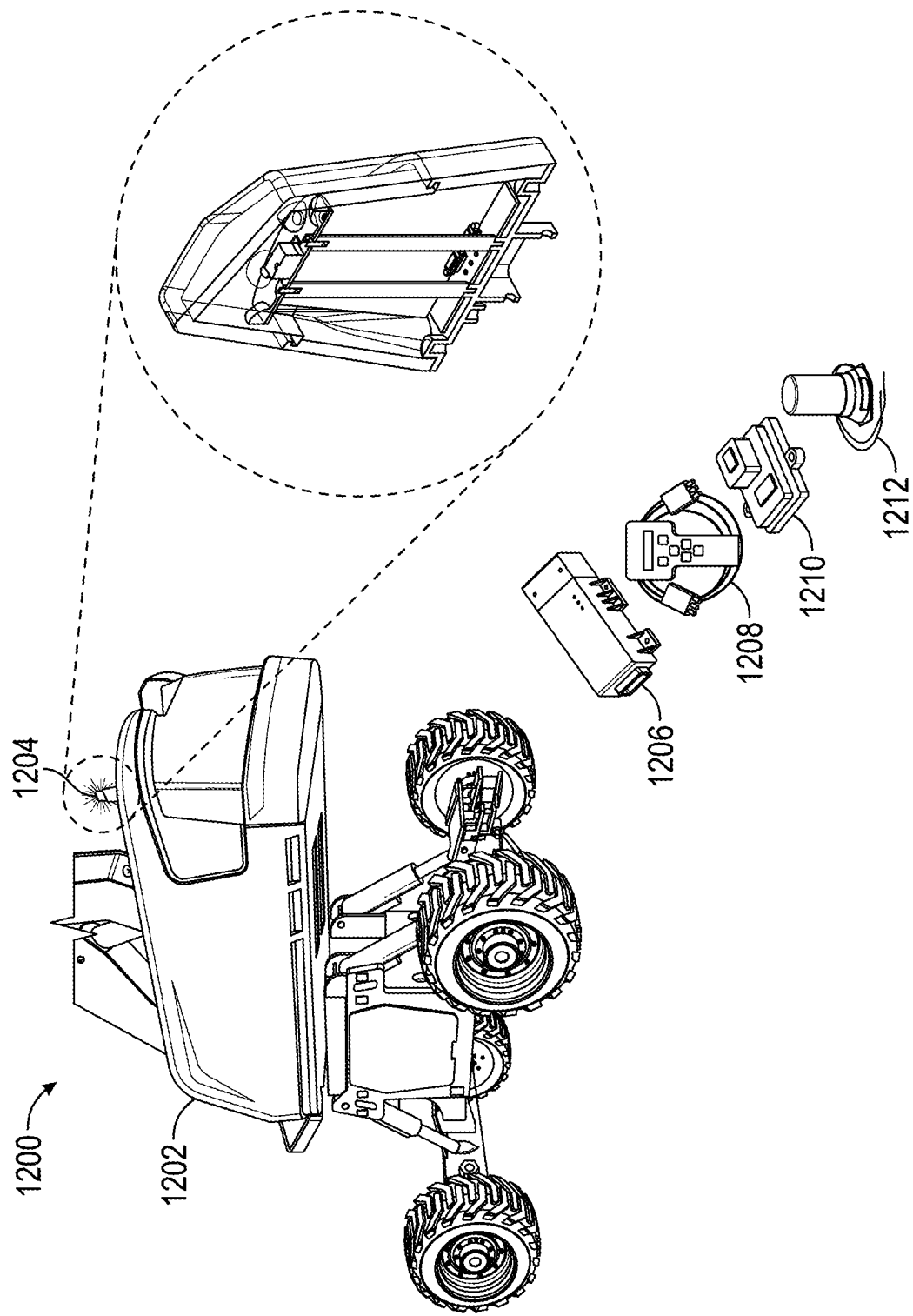
FIG. 12 is a picture representation of a work machine provisioned with an integrated connectivity module and beacon, according to some embodiments.

Referring to FIG. 12, a work machine 1202 is provisioned with an indicator 1204 (e.g. a connectivity module with integrated beacon light, control devices, and communications devices). The indicator 1204 may, for example, illuminate a light visible to a user in response to user activation of a "find my machine" or "identify my equipment" application hosted on a user device connected to the equipment identification system 200. The indicator 1204 may function like a conventional work machine warning beacon 1212.

In some embodiments, the connectivity module may be configured with a telematics control unit 1206, a multifunction light beacon 1212, one or more multi-channel communication modems 1210, one or more analytics devices 1208, one or more antennas, one or more power sources, one or more positioning systems, one or more local fleet connectivity processors, and one or more interface blocks, one or more machine connectivity provisions, and one or more memory devices. For example, the connectivity module with integrated beacon 1204 may be configured as an integrated connectivity device provisioned with all components required to connect a work machine 1202 that is not provisioned with networking equipment to a equipment identification system 200. The connectivity module with integrated beacon 1204 may include, for example, a telematics control unit specific componentry included (e.g. multicolor beacon, GPS/GNSS, communications modem, antenna, controller, memory device, interface blocks, housing, etc.) and be affixable to a work machine using temporary or permanent physical, electrical, or electronic connections. The connectivity module connected to the work machine may be configured to selectively enable, activate, disable, and deactivate components of the connectivity module and the work machine to which it is communicatively connected. For example, a connectivity module with integrated beacon 1204 connected to a work machine equipped with headlights may enable and activate the work machine headlights and disable the integral beacon in response to a "find me" command received by the connectivity module from the equipment identification system 200. The connectivity module with integrated beacon 1204 is configured, in some embodiments, to determine what components integral to the module and what components that are machine equipment are activated in response to a command such that only the components necessary to respond to the command are activated and no individual components are activated in conflict with the components activated to respond to the command.

Figure 13:
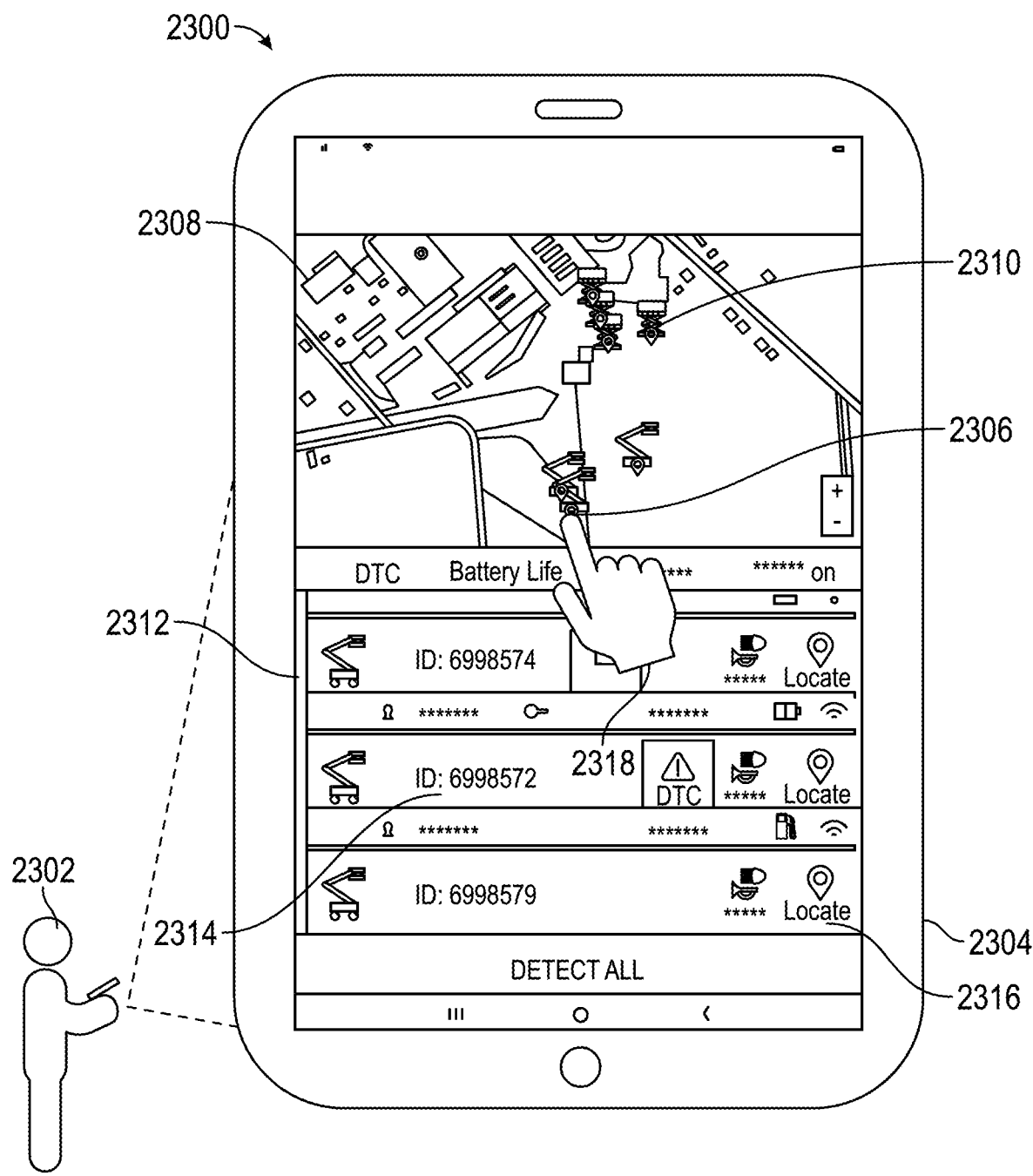
FIG. 13 is a drawing representing a view of user interface of a multiple machine identification system, according to some embodiments.
Figure 14:
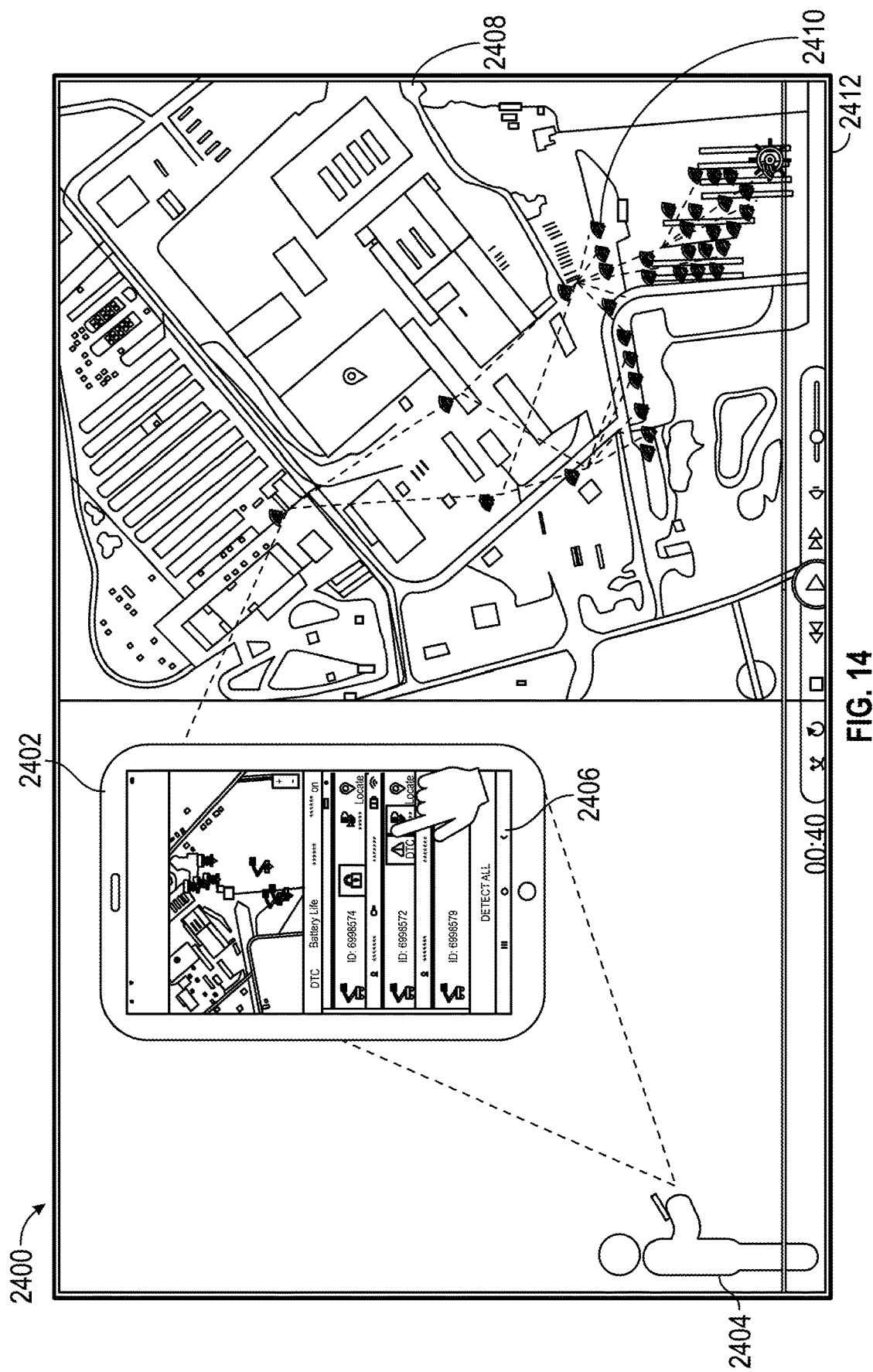
FIG. 14 is drawing of another view of the user interface of the multiple machine identification system of FIG. 13, according to some embodiments.

Referring to FIG. 13-14, a user 2302 may use the local fleet connectivity system by interacting 2318 with an application hosted on a user device 2304 that generates a user interface 2308. The user device 2304 and various work machines 1202 are interconnected via the local fleet connectivity system 200. The user 2302 selects a machine 2306 from a view of a group of a machines 2310 connected to the local fleet connectivity system 200 at a work site. The user interface 2308 may depict, for example, imagery of a work site with overlays of machine locations (e.g., a map) 2310 and information regarding machine specific information including status (e.g., location, fuel state, state of charge, etc.) 2312, 2314, 2316. The application may dynamically filter the map to illustrate the total machine population and locations and statuses of individual machines in the population. In some examples, a remote user may apply filters (e.g., proximity to a user, filters related to machine status including self-test, fuel level, state of charge, etc.) to a specific work site network much the same as can be done locally via an application on a mobile user device (e.g., in the instance where a remote user can apply the desired user configurable rules to assist a local user w/o the need of mobile application use). The user may select a machine or group of machines using an application and communicate with the machine or group of machines (directly or via a cloud) to have that machine provide a an equipment identify indication (e.g., a colored light, a light pattern, a combination of light colors and patterns, activation of a horn).

Referring to FIG. 14, a user interface 2400 of a machine connectivity application is shown, according to an exemplary embodiment. The user interface 2400 may include a map 2408. The map may be an aerial view of a job site. The map 2408 may include machine indicators 2410 that show where machines are disposed on the map 2408. A light on a connectivity module can be used to identify a first machine 2412 of the plurality of machines within the job site and indicate various statuses of the first machine (e.g., fuel level, state of charge, fault status, ignition on/off, in operation, etc.). The application user interface 2406 on user device 2402 can be used by a user 2404 to select which status they want to be displayed on a fleet within user defined parameters (e.g., a connected range of the user device). Features of the "find me" application can be used independently of or in conjunction with the filter criteria of a desired subset of a fleet. The equipment identification system application can also provide user interfaces for other instructions or commands (e.g. allowing a machine to be powered up or shut down).

Figure 15:
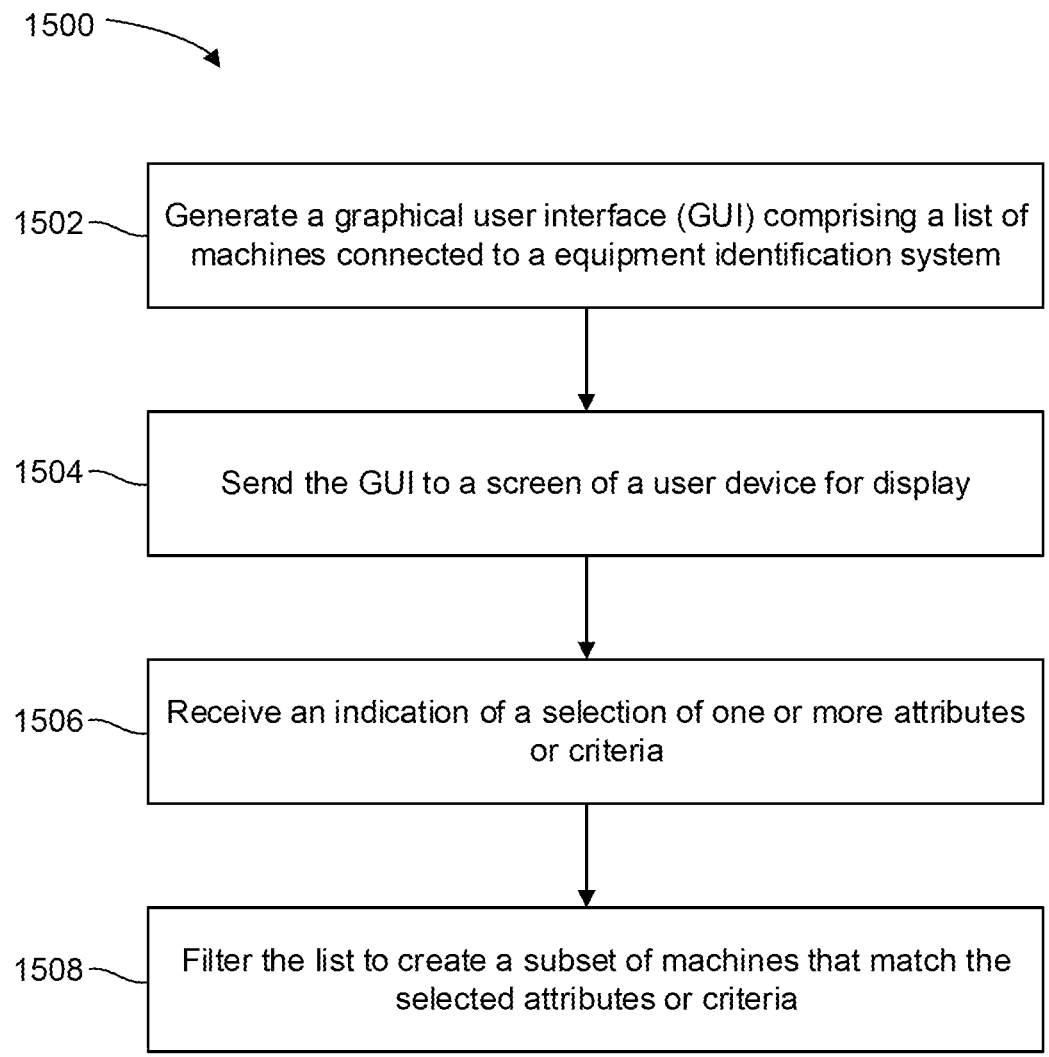
FIG. 15 is a flow diagram of a method for a multiple machine identification system.

Referring to FIG. 15, a process 1500 (or method) for identifying multiple machines is shown according to some embodiments. The method may be performed by one or more processing circuits comprising one or more memory devices coupled to one or more processors. The one or more memory devices may be configured to store instructions thereon that, when executed by the one or more processors, cause the one or more processors to perform the operations of the method. In some embodiments, the one or more processing circuits may be integrated into a remote computing system (e.g. cloud and web services 268). In other embodiments, the one or more processing circuits may be integrated into a user device (e.g. user device 272). One or more machines may connect to the user device via a local wireless connectivity system or via a cellular networks (e.g., via cell towers 240), or other existing or new means of digital connectivity. Each machine may include a connectivity module for communicating with the equipment identification system (e.g. connectivity modules 218, 320). The one or more processing circuits may communicate across a wireless network by sending messages to the one or more machines and to one or more user devices each communicatively connected to the network. A user may interact with the machines via an application provided on the user device that displays a graphical user interface (GUI).

Following activation of a local fleet connectivity system and deployment of machines to a work site, machines connect to the system and are identified digitally within the system and applications provided through the system. Process 1500 begins at operation 1502 with the generation of a GUI including a list of one or more of the machines connected to the equipment identification system. In some embodiments, the list may include additional information regarding each machine (e.g., fuel level/SOC, DTC status, ignition on/off, in operation, etc.). In some embodiments, the list may include location information regarding each machine (e.g., work site name, latitude and longitude etc.). In some embodiments, the GUI may include a map showing the location of each machine, as shown in FIG. 13. At operation 1504, the GUI is sent to the screen of a user device for display. The user device may be, for example, a smartphone, a tablet computer, a laptop computer, a desktop computer, or any device with a screen to display the GUI and that allows the user to interact with the application (e.g., to receive machine data, to send messages, instructions, or commands to the machines, etc.).

At operation 1506, an indication of a selection of one or more attributes or criteria is received from the user device. For example, a user may select attributes relating to the machines, such as a machine type, a battery status, a machine model number, a machine manufacturer, a machine location, a machine work site tag, a machine status, a repair status, a DTC status, a fuel status, a use status, or the number of other machines that must be used to access or move a machine. At operation 1508, the list is filtered to create a subset of the plurality of machines. The subset includes machines that match the selected attributes or criteria. For example, a user may filter the list by selecting an attribute of "has less than 25 percent fuel remaining." The subset of machines that is created will then include only those machines with less than 25 percent fuel remaining. The subset may be further narrowed with additional criteria. When the GUI comprises a map showing a location of each machine, filtering the list may include temporarily removing machines from the map that do not match the selected attributes or criteria.

In some embodiments, a user may enter, via the GUI on the user device, a required number of machines. A subgroup containing the desired number of machines from the subset of machines may then be identified. A message may then be sent to the subgroup of machines instruction the machines to generate one or both of a visual indication or an audible indication. For example, if a new jobsite requires three scissor lifts, the user may filter the list of machines to create a subset that includes only scissor lifts. The user may then enter, via the GUI on the user device, the number of scissor lifts required at the new jobsite. A subgroup containing three scissor lifts may then be identified. A message may then be sent to the three scissor lifts causing the three scissor lifts to generate a visible or audible indication, such as illuminating a beacon of each lift. It should be understood that instructing the machine to generate an indication may include instructing a connectivity module coupled to the machine to generate the indication. In some embodiments, the subgroup of machines may be the machines in the subset of machines that are physically closest to the user device. In other embodiments, a user may select a desired location and the subgroup of the subgroup of machines may be the machines in the subset of machines that are physically closest to the selected location. In some embodiments the message sent to the machines instructs each machine to generate a visual or audible indicator that is different than the visual or audible indicator of the other machines. For example, each machine in the subgroup may display a different color light. In some embodiments, the GUI may update to indicate the visible or audible indicator associated with each machine. For example, the list may be updated to include each color being displayed by the respective machine. In some embodiments, the user may select one of the machines from the subgroup (e.g., by clicking the machine name on the list of machines on the GUI with a mouse or touching it on a touchscreen device) and a message may be sent to the selected machine, causing the selected machine to generate a second visual or audible indication. For example, a user may want to confirm that a machine corresponds to a certain machine from the list. The user may select the machine via the GUI on the user device and, for example, the light may flash on and off to indicate which machine corresponds to the selected machine from the list. The user may then identify the selected machine based on the visual or audible indication generated by the indicator.

In some embodiments, the subgroup of machines consists of the machines in the subset of machines can be moved to a selected location while moving a minimum number of machines from a plurality of machines. For example, if machines are stored in a warehouse, fewer machines will be required to be moved to allow a selected machine to move out of the warehouse door if the machine is closer to the door. A selected machine farther from the door may be blocked by several other machines that will have to be moved to allow the selected machine to move out the door. In some embodiments, the number of machines that must be moved to allow machines in the subset of machines to reach a selected location may be calculated and the subgroup may be determined based on the machines in the subset that require the fewest other machines to move.

A user may press a button on an application presented to the user on a user device (e.g. a smart phone). The application (e.g. an "identify my machine" application) generates a command to activate a visual indication (e.g. a beacon light) or an audible indication (e.g. a machine horn) or a combination of indications to indicate to a user the machines selected via the application. The user may apply one or more dynamic filters (e.g. machine feature or status criteria) to a map of machines at a work site through the application to illustrate one or more machine population. In some implementations, a remote user may apply such a filter to a specific jobsite network much the same as can be done locally via a mobile application. The method may also include using lights on machine connectivity modules to illustrate various statuses of machines (fuel level/SOC, DTC status, ignition on/off, in operation, etc.). The method may further include using the application as an interface for a user to select which status they want to be displayed on a fleet of machines within a connected range of the user's device or within a designated proximity to a user. The method may also include a user sending commands to machines through the application (e.g. commanding an identified machine to be powered up or shut down). In some embodiments, beacons on several machines can be used at one time to identify multiple machines both digitally in an application and on the machines. This would allow a person to pick a machine physically and tie it to the digital version of the machine, saving time searching for serial numbers and matching them. A user may also use an application to, for example, to identify a generic local group of machines nearest the user that fit a user defined criteria (e.g. which machine is easiest to pull out that is charged, no faults, and of a specific model). In some implementations, a user may simultaneously communicate with a plurality of machines (directly or via a cloud) that satisfy some selected criteria (e.g., a group of machines that are the same model) and have them separately identify themselves (e.g., with different color lights). A user can then, for example, select the "green machine", and it might flash its lights to say "this one?" and then the user may tap verify on the application to partner with that machine. Information from the selected machines could then filter back to the local fleet connectivity system based on the associations generated via the application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the load map interface systems and methods as shown in the various exemplary embodiments is illustrative only. Additionally, any element disclosed in one embodiment may be incorporated or utilized with any other embodiment disclosed herein. For example, the warning zones of the exemplary embodiment may be eliminated or additional zones may be added. Although only one example of an element from one embodiment that can be incorporated or utilized in another embodiment has been described above, it should be appreciated that other elements of the various embodiments may be incorporated or utilized with any of the other embodiments disclosed herein.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A local fleet connectivity system for identifying multiple machines, the system comprising:
a plurality of connectivity modules, each connectivity module communicatively and physically coupled to one of a plurality of machines, each connectivity module configured to communicate with the other connectivity modules via a network connection; and
a user device configured to communicate with the connectivity modules via a network connection;
wherein, in response to a user selection on an application hosted on the user device, two or more machines of the plurality of machines are configured to generate one or both of an audible signal or a visual signal, wherein each of the two or more machines is configured to generate a different audible signal or visual signal in response to the user selection;
wherein the two or more machines comprise a user-selected first machine and one or more other machines that are required to be moved in order to move the user-selected first machine to a selected location, wherein the one or more other machines are automatically selected by the application based on the selection of the user-selected first machine.

2. The local fleet connectivity system of claim 1, wherein the connectivity modules of the two or more machines each comprise a light configured to illuminate to generate the visual signal, wherein the light of each connectivity module of the two or more machines illuminates with a different color in response to the user selection.

3. The local fleet connectivity system of claim 1, wherein the user selection comprises dynamically filtering the plurality of machines according to one or more selectable attributes or criteria.

4. The local fleet connectivity system of claim 3, wherein the one or more selectable attributes or criteria comprise one or more of a machine type, a battery status, a machine model number, a machine manufacturer, a machine location, a machine work site tag, a machine status, a repair status, a DTC status, a fuel status, a use status, or a number of other machines that must be used to access or move a machine.

5. The local fleet connectivity system of claim 1, wherein a control module of each of the one or more other machines is configured (i) to receive instructions via the connectivity module of the associated machine and (ii) to control the associated machine to move the associated machine out of a path of the user-selected first machine to the selected location.

6. A local fleet connectivity system for identifying multiple machines at a site, the system comprising:
one or more processing circuits comprising one or more memory devices coupled to one or more processors, the one or more memory devices configured to store instructions thereon that, when executed by the one or more processors, cause the one or more processors to:
communicate across a wireless network by sending messages to a plurality of machines and a user device each communicatively connected to the network;
generate a graphical user interface (GUI) comprising a list of the plurality of machines;
send the GUI to a screen of the user device for display;
receive, via the GUI, an indication of a selection one or more attributes or criteria;
filter, in response to receiving the indication, the list to create a subset of machines, from the plurality of machines, that match the selected attributes or criteria;
receive, via the GUI, an indication of a required number of machines;
identify a subgroup of machines from the subset of machines, wherein the subgroup of machines comprises the required number of machines; and
send a message instructing each of the subgroup of machines to generate one or both of a visual indication or an audible indication, the message instructing each machine to generate a visual or audible indication that is different than visual or audible indications of the other machines, wherein the subgroup of machines consists of the machines in the subset of machines that are (a) physically closest to the user device or (b) the physically closest to a selected location.

7. The local fleet connectivity system of claim 6, wherein the GUI comprises a map showing a location of each machine and wherein filtering the list comprises removing machines from the map that do not match the selected attributes or criteria.

8. The local fleet connectivity system of claim 6, wherein the instructions further cause the one or more processors to receive, via the GUI, an indication of a selection of the selected location, wherein the subgroup of machines consists of the machines in the subset of machines that are physically closest to the selected location.

9. The local fleet connectivity system of claim 6, wherein the instructions further cause the one or more processors to:
update the GUI to identify the visual or audible indication associated with each machine in the subgroup of machines;
receive, via the GUI, an indication of a selection of a machine from the subgroup; and
send a message, in response to receiving the indication of a selection of a machine, an instruction to the selected machine to generate a second visual or audible indication.

10. The local fleet connectivity system of claim 6, wherein the instructions further cause the one or more processors to receive, via the GUI, an indication of a selection of a location, wherein the subgroup of machines consists of the machines in the subset of machines that can be moved to the location while moving a minimum number of the machines in the plurality of machines.

11. A method of identifying multiple machines at a site, the method comprising:
generating a graphical user interface (GUI) comprising a list of a plurality of machines;
sending the GUI to a screen of a user device for display;
receiving, via the GUI, an indication of a selection one or more attributes or criteria;
filtering, in response to receiving the indication, the list to create a subset of machines, from the plurality of machines, that match the selected attributes or criteria;
sending messages instructing each of a subgroup of machines in the subset of machines to generate a different visual indication; and
updating the GUI to identify the visual indication associated with each machine in the subgroup of machines.

12. The method of claim 11, further comprising:
receiving, via the GUI, an indication of a required number of machines; and
identifying the subgroup of machines from the subset of machines, wherein the number of machines in the subgroup of machines equals the required number of machines.

13. The method of claim 12, wherein the subgroup of machines consists of the machines in the subset of machines that are physically closest to a selected location.

14. The method of claim 12, further comprising:
receiving, via the GUI, an indication of a selection of a machine from the subgroup; and
sending a message, in response to receiving the indication of a selection of a machine, an instruction to the selected machine to generate a second visual indication or an audible indication.

15. The method of claim 12, wherein the subgroup of machines consists of the machines in the subset of machines that can be moved to a selected location while moving a minimum number of machines from the plurality of machines.

* * * * *